United States Patent
Suzuki

(10) Patent No.: US 9,826,111 B2
(45) Date of Patent: Nov. 21, 2017

(54) INFORMATION PROCESSING APPARATUS AND IMAGE PROCESSING SYSTEM

(71) Applicant: Junji Suzuki, Kanagawa (JP)

(72) Inventor: Junji Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/060,765

(22) Filed: Mar. 4, 2016

(65) Prior Publication Data

US 2016/0274848 A1  Sep. 22, 2016

(30) Foreign Application Priority Data

Mar. 16, 2015 (JP) ................. 2015-051968

(51) Int. Cl.
*G06F 15/00* (2006.01)
*H04N 1/00* (2006.01)

(52) U.S. Cl.
CPC ..... *H04N 1/00267* (2013.01); *H04N 1/00456* (2013.01); *H04N 2201/0094* (2013.01)

(58) Field of Classification Search
CPC . G06F 3/1256; G06F 3/1206; H04N 1/00456; H04N 2201/0094
USPC ...................................... 358/1.15
See application file for complete search history.

(56) References Cited

U.S. PATENT DOCUMENTS

| 8,654,036 B2 | 2/2014 | Takahashi et al. | |
| 2005/0231739 A1* | 10/2005 | Lee | G06F 3/13 358/1.1 |
| 2013/0073942 A1* | 3/2013 | Cherkasov | G06F 17/30011 715/233 |
| 2014/0333963 A1* | 11/2014 | Nakamura | H04L 67/16 358/1.15 |
| 2015/0062628 A1* | 3/2015 | Nagasawa | H04N 1/001 358/1.15 |

FOREIGN PATENT DOCUMENTS

| JP | 2009-225224 | 10/2009 |
| JP | 2013-054623 | 3/2013 |

* cited by examiner

*Primary Examiner* — Saeid Ebrahimi Dehkord
(74) *Attorney, Agent, or Firm* — IPUSA, PLLC

(57) ABSTRACT

An information processing apparatus includes an acquisition control unit that acquires a plurality of image data sets of an image to be displayed in a plurality of different data formats using an image acquisition unit that acquires image data, and a determination unit that determines one image data set to be displayed by an image display unit from among the plurality of image data sets acquired in the plurality of different data formats by the acquisition control unit based on the image display unit that will display the image.

17 Claims, 16 Drawing Sheets

INFORMATION PROCESSING APPARATUS AND IMAGE PROCESSING SYSTEM

BACKGROUND OF THE INVENTION

1. Field of the Invention

The present invention relates to an information processing apparatus and an image processing system.

2. Description of the Related Art

Image forming apparatuses such as an MFP (Multifunction Peripheral) having a plurality of functions including printing, copying, scanning, and facsimile transmission, for example, are known. Also, technologies exist for enabling smart devices such as smart phones and tablet terminals to use a function of an image forming apparatus using an API (Application Programming Interface) that is provided by the image forming apparatus, for example. In this way, an information terminal such as a smart device may acquire an image to be displayed using an image forming apparatus such as an MFP, and display the acquired image on a display apparatus such as a projector.

Also, an MFP is known that pre-registers data formats that can be used by a plurality of teleconference terminal apparatuses, converts acquired data into a format that can be used by a teleconference terminal apparatus corresponding to an output destination, and outputs the converted data to the output destination teleconference terminal apparatus (e.g., see Japanese Laid-Open Patent Publication No. 2009-225224).

In the case of displaying an image acquired by an image forming apparatus, such as an MFP, at a display apparatus such as a projector using an information terminal such as a smart device, some display apparatuses may not be able to display an image in certain data formats, for example. In such case, as described in Japanese Laid-Open Patent Publication No. 2009-225224 mentioned above, for example, the information terminal may pre-register the data formats displayable by a plurality of different display apparatuses and convert the data format of an image to be displayed based on the display apparatus that will display the image, for example. However, according to such a technique, the display apparatuses to be used to display an image have to be registered in advance with the information terminal, for example. Thus, difficulties arise in attempting to display an image on any display apparatus that is not registered with the information terminal, for example.

SUMMARY OF THE INVENTION

It is a general object of at least one embodiment of the present invention to provide an information processing apparatus that can facilitate acquisition an image to be displayed from an image forming apparatus and using any display apparatus to display the acquired image.

According to one embodiment of the present invention, an information processing apparatus includes an acquisition control unit that acquires a plurality of image data sets of an image to be displayed in a plurality of different data formats using an image acquisition unit that acquires image data, and a determination unit that determines one image data set to be displayed by an image display unit from among the plurality of image data sets acquired in the plurality of different data formats by the acquisition control unit based on the image display unit that will display the image.

DESCRIPTION OF THE PREFERRED EMBODIMENTS

In the following, embodiments of the present invention are described with reference to the accompanying drawings.

<System Configuration>

Figure 1:
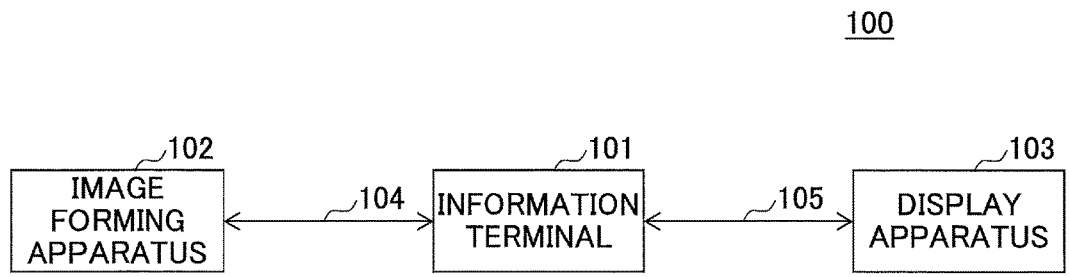
FIG. 1 is a schematic diagram illustrating an image processing system according to one aspect of the present invention.

FIG. 1 is a schematic diagram of an image processing system 100 according to an aspect of the present invention. The image processing system 100 includes an information terminal 101, an image forming apparatus 102, and a display apparatus 103. The information terminal 101 is an example of an information processing apparatus according to the present invention. The information terminal 101 may be implemented by a tablet terminal, a smartphone, or a PC (Personal Computer), for example. The image forming apparatus 102 is an example of an image acquisition unit for acquiring (e.g., scanning or capturing) image data. The image forming apparatus 102 may be an MFP having a plurality of functions such as printing, copying, scanning, and facsimile transmission, or a scanner, for example. The display apparatus 103 is an example of an image display unit for displaying (e.g., projecting) an image. The display apparatus 103 may be a projector or a liquid crystal display, for example.

The information terminal 101 and the image forming apparatus 102 are capable of exchanging data via a communication unit 104, which may be a network such as a LAN (Local Area Network) or a WAN (Wide Area Network), a wired cable such as a USB (Universal Serial Bus) cable, or a short-range wireless communication unit, for example. Similarly, the information terminal 101 and the display apparatus 103 are capable of exchanging data via a communication unit 105, which may be a network such as a LAN or a WAN, a wired cable such as a USB cable, or a short-range wireless communication unit, for example.

A user of the information terminal 101 may use an application program (hereinafter referred to as "app") to acquire image data to be displayed at the image forming apparatus 102 and display the acquired image data at the display apparatus 103.

Figure 2:
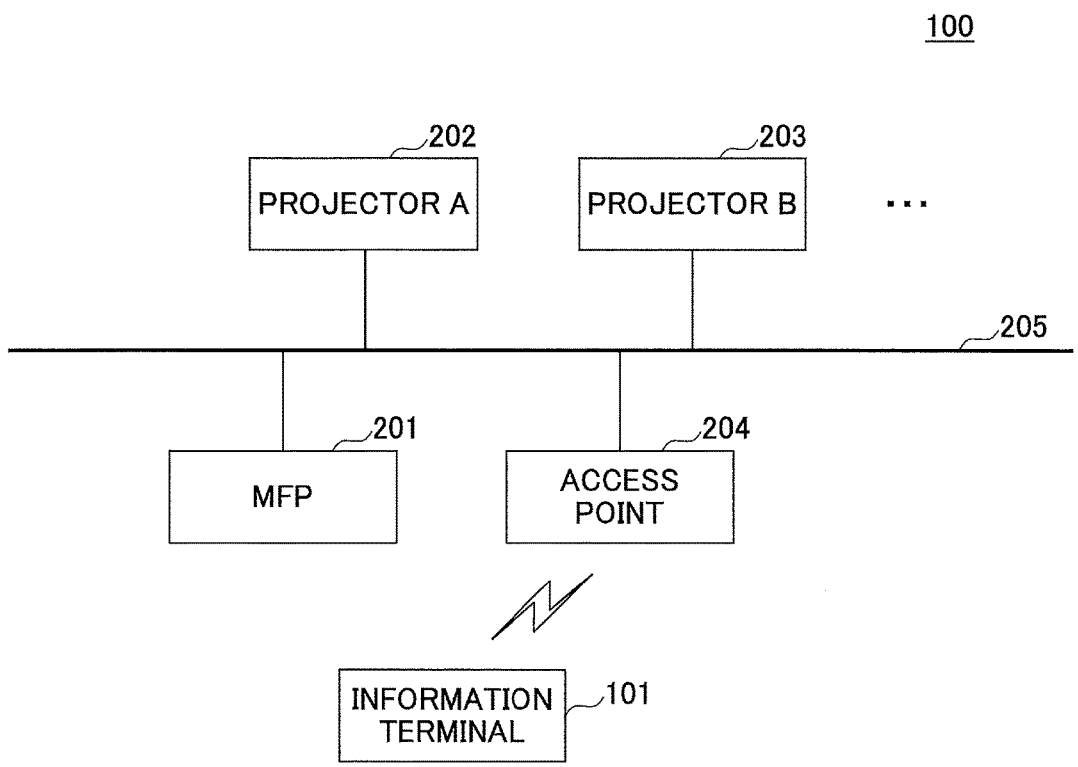
FIG. 2 is a block diagram illustrating an example configuration of the image processing system.

FIG. 2 is a block diagram illustrating an example configuration of the image processing system 100. In FIG. 2, the image processing system 100 includes an MFP 201, a projector A 202, a projector B 203, and a wireless access point 204 that are connected to a network 205 such as the Internet or a LAN, for example. The image processing system 100 also includes the information terminal 101 that can be connected to the network 205 via the access point 204. Note that the MFP 201 is an example of the image forming apparatus 102. The projector A 202 and the projector B 203 are examples of the display apparatus 103. Note, also, that FIG. 2 illustrates one example of a specific system configuration of the image processing system 100 and is not intended to limit the scope of the present invention.

In FIG. 2, when the information terminal 101 receives an acquisition request for image data for image projection through a user operation of a relevant app, for example, the information terminal 101 uses the MFP 201 to acquire image data of an image to be displayed in a plurality of different data formats. For example, the information terminal 101 may request the MFP 201 to sequentially scan a document that is set in the MFP 201 to generate image data in a plurality of data formats that are supported by the MFP 201 (i.e., data formats in which the MFP 201 is capable of scanning an image), and the information terminal 101 may then acquire the image data in the plurality of data formats scanned by the MFP 201. Note that the plurality of data formats vary in at least one of image format, resolution, color mode (color/black & white, color depth, and data size, for example.

Also, when the information terminal 101 receives a projection request to project the acquired image data for image projection at the projector A 202 through a user operation of a relevant app, for example, the information terminal 101 determines one image data set to be projected by the projector A 202 from among the plurality of image data sets acquired in the plurality of data formats. For example, the information terminal 101 may sequentially send the plurality of image data sets acquired in the plurality of data formats to the projector A 202 until the projector A 202 is able to properly display the image data. The information terminal 101 may then determine the first image data set that could be properly displayed by the projector A 202 as the one image data set to be displayed by the projector A 202, for example.

In a preferred embodiment, the information terminal 101 may assign a priority order to the plurality of image data sets acquired in the plurality of data formats based on image quality (e.g. assigning higher priority to image data with better quality), for example, and the information terminal 101 may sequentially send the plurality of image data sets to the projector A 202 according to the priority order. In this way, the information terminal 101 may be able to have the projector A 202 display image data with better image quality, for example.

Similarly, when the information terminal 101 receives a projection request to project the acquired image data for image projection at the projector B 203 through a user operation of a relevant app, for example, the information terminal 101 determines one image data set to be displayed by the projector B 203 from among the plurality of image data sets acquired in the plurality of data formats.

With the above configuration, the information terminal 101 may acquire a plurality of image data sets in a plurality of different data formats from the MFP 201 and readily display a suitable image data set on a given projector from among a plurality of projectors of various types, functions, and/or generations, for example.

<Hardware Configuration>

(Information Terminal Hardware Configuration)

Figure 3:
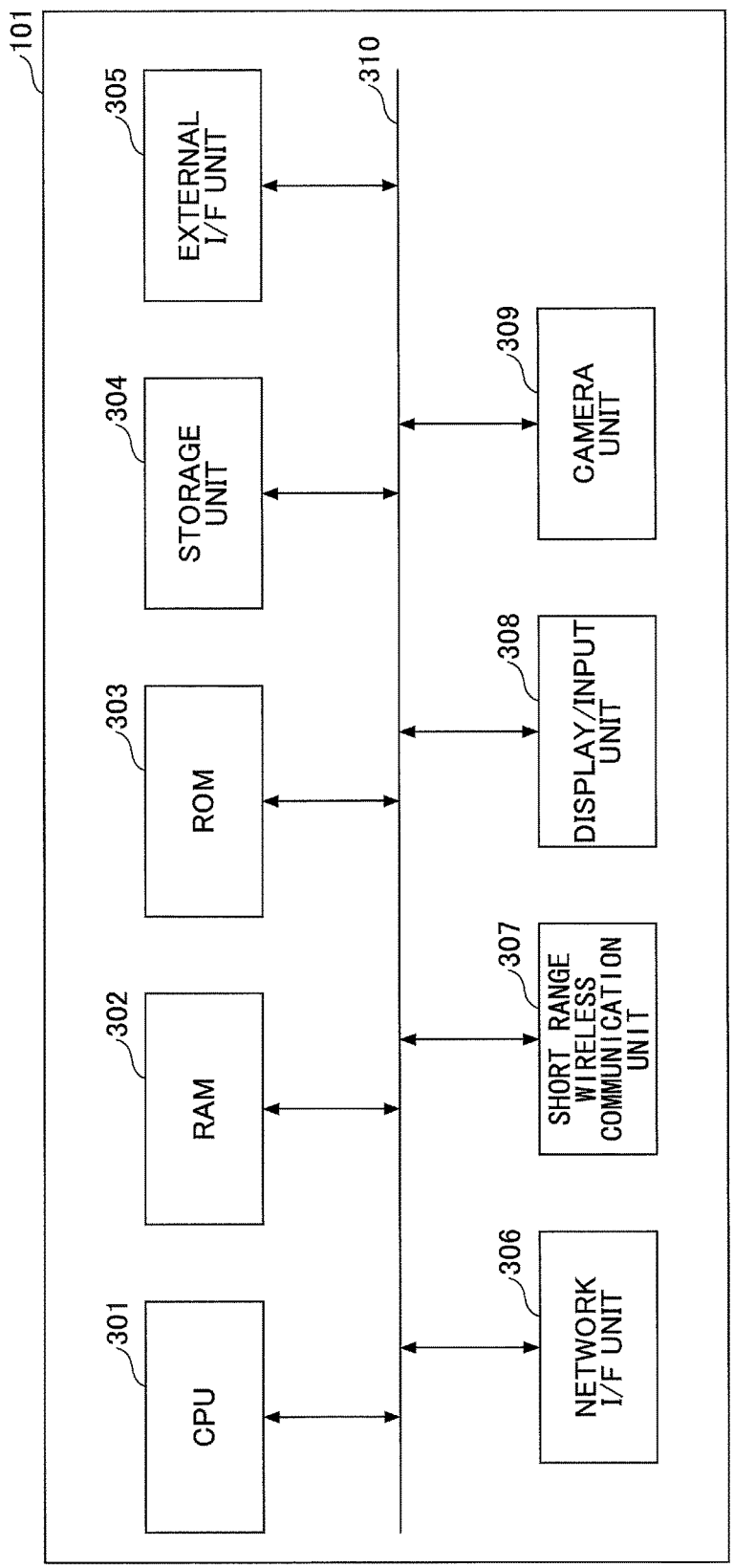
FIG. 3 is a block diagram illustrating an example hardware configuration of an information terminal according to an aspect of the present invention.

FIG. 3 is a block diagram illustrating an example hardware configuration of the information terminal 101 according to an embodiment of the present invention. The information terminal 101 may be configured as a general computer including a CPU (Central Processing Unit) 301, a RAM (Random Access Memory) 302, a ROM (Read Only Memory) 303, a storage unit 304, an external I/F (interface) unit 305, a network I/F unit 306, a short-range wireless communication unit 307, a display/input unit 308, a camera unit 309, and a bus 310.

The CPU 301 is a computing unit that implements various functions of the information terminal 101 by loading programs and data stored in the ROM 303 or the storage unit 304 into the RAM 302 and executing relevant processes. The RAM 302 is a volatile memory used as a working area for the CPU 301. The ROM 303 is a nonvolatile memory that is able to retain programs and data even when the power is turned off and may be configured by a flash ROM, for example. The storage unit 304 may be a storage device such as a HDD (Hard Disk Drive) or a SSD (Solid State Drive), for example, and may store an OS (Operation System), apps, and various data, for example.

The external I/F unit 305 is an interface for connecting an external device to the information terminal 101. The external device may be a storage device such as a USB memory, a memory card, a recording medium such as an optical disc; or an electronic device such as the image forming apparatus 102 or the display apparatus 103, for example.

The network I/F unit 306 is a communication interface such as a wireless LAN that connects the information terminal 101 to a network to enable data exchange with the image forming apparatus 102 or the display apparatus 103, for example. The short-range wireless communication unit 307 is a communication interface for establishing short-range wireless communication based on NFC (Near Field Communication) or Bluetooth (registered trademark) Low Energy (hereinafter referred to as "BLE"), for example.

The display/input unit 308 may be a display/input device such as a touch panel display integrating a touch panel and a display, for example. The display/input unit 308 includes an input unit for operating the information terminal 101 and a display unit for displaying a process result of the information terminal 101. Note that in some embodiments, the display/input unit 308 may include the input unit and the display unit as separate units, for example. The camera unit 309 is an imaging device for capturing an image. The bus 310 is connected to each of the above components and transmits signals such as address signals, data signals, and various control signals, for example.

(Image Forming Apparatus Hardware Configuration)

Figure 4:
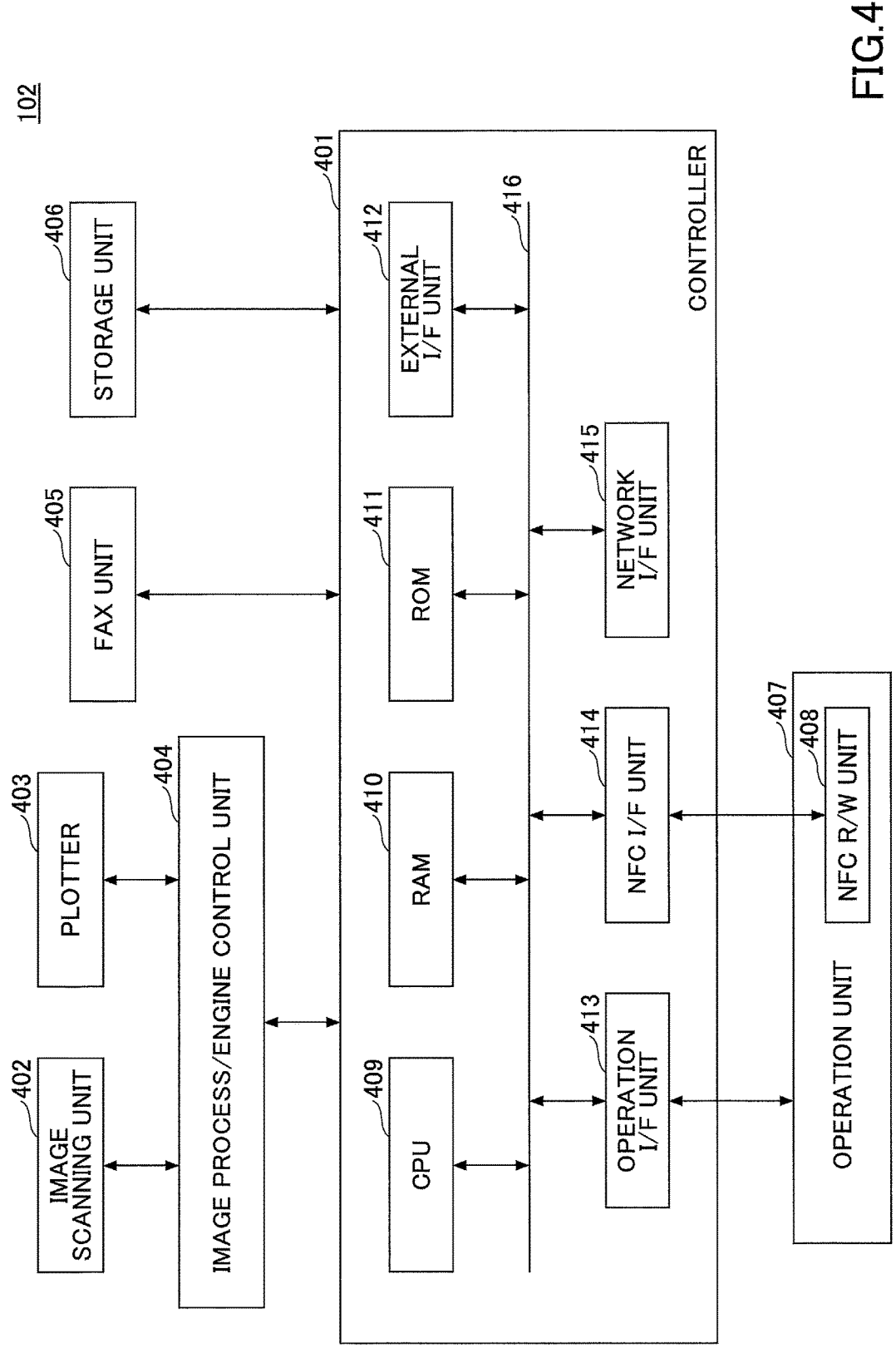
FIG. 4 is a block diagram illustrating an example hardware configuration of an image forming apparatus according to an aspect of the present invention.

FIG. 4 is a block diagram illustrating an example hardware configuration of the image forming apparatus 102 according to an embodiment of the present invention. The image forming apparatus 102 includes a controller 401, an image scanning unit 402, a plotter 403, an image process/engine control unit 404, a FAX unit 405, a storage unit 406, an operation unit 407, and a NFC R/W (Reader/Writer) unit 408.

The controller 401 may be configured as a general computer including, for example, a CPU 409, a RAM 410, a ROM 411, an external I/F unit 412, an operation I/F unit 413, a NFC I/F unit 414, and a network I/F unit 415 that are connected via a bus 416.

The CPU 409 is a computing unit that implements various functions of the image forming apparatus 102 by loading programs and data stored in the ROM 411 or the storage unit 406 into the RAM 410 and executing relevant processes. The RAM 410 is a volatile memory used as a working area for the CPU 409. The ROM 411 is a nonvolatile memory that can retain programs and data even when the power is turned off and may be configured by a flash ROM, for example.

The external I/F unit 412 is an interface with an external device. The external device may include storage devices such as a USB memory, a memory card, and a recording medium such as an optical disk, and information processing apparatuses such as the information terminal 101, for example. The operation I/F unit 413 is an interface for connecting the operation unit 407 to the controller 401. The NFC I/F unit 214 is an interface for connecting the NFC R/W unit 408, which reads/writes data from/on an NFC device, to the controller 401 via NFC communication. Note that NFC is an example of a short-range wireless communication, and the image forming apparatus 102 may alternatively include some other short-range communication unit for establishing communication based on some other short-range communication protocol (e.g., BLE) in place of the NFC I/F unit 214.

The network I/F unit 415 is a communication interface that connects the image forming apparatus 102 to a network to enable exchange of information with the information terminal 101 that is connected to a network, for example. The bus 416 transmits signals such as address signals, data signals, and various control signals, for example.

The image scanning unit 402 may be a scanner engine that scans an image of a document or the like under control of the image process/engine control unit 404, for example. The plotter unit 403 may be a printer engine that outputs an image on a printing medium such as paper under control of the image process/engine control unit 404, for example. The image process/engine control unit 404 controls the image scanning unit 402 and the plotter unit 403 to execute image processes.

The FAX unit 405 includes a hardware engine for sending and receiving faxes and a control unit for controlling the hardware engine, for example. The storage unit 406 may be a storage device such as a HDD or a SSD, for example, and stores an OS, applications, and various types of information and data including image data and the like.

The operation unit 407 includes an input unit for accepting user input operations and a display unit for displaying information to the user. Note that in the example illustrated in FIG. 4, the operation unit 407 includes the NFC R/W unit 408, which reads/writes data from/on a NFC device via NFC communication. However, FIG. 4 illustrates merely one example configuration of the image forming apparatus 102, and the NFC R/W unit 408 may alternatively be provided as a separate unit from the operation unit 407, for example.

(Display Apparatus Hardware Configuration)

Figure 5:
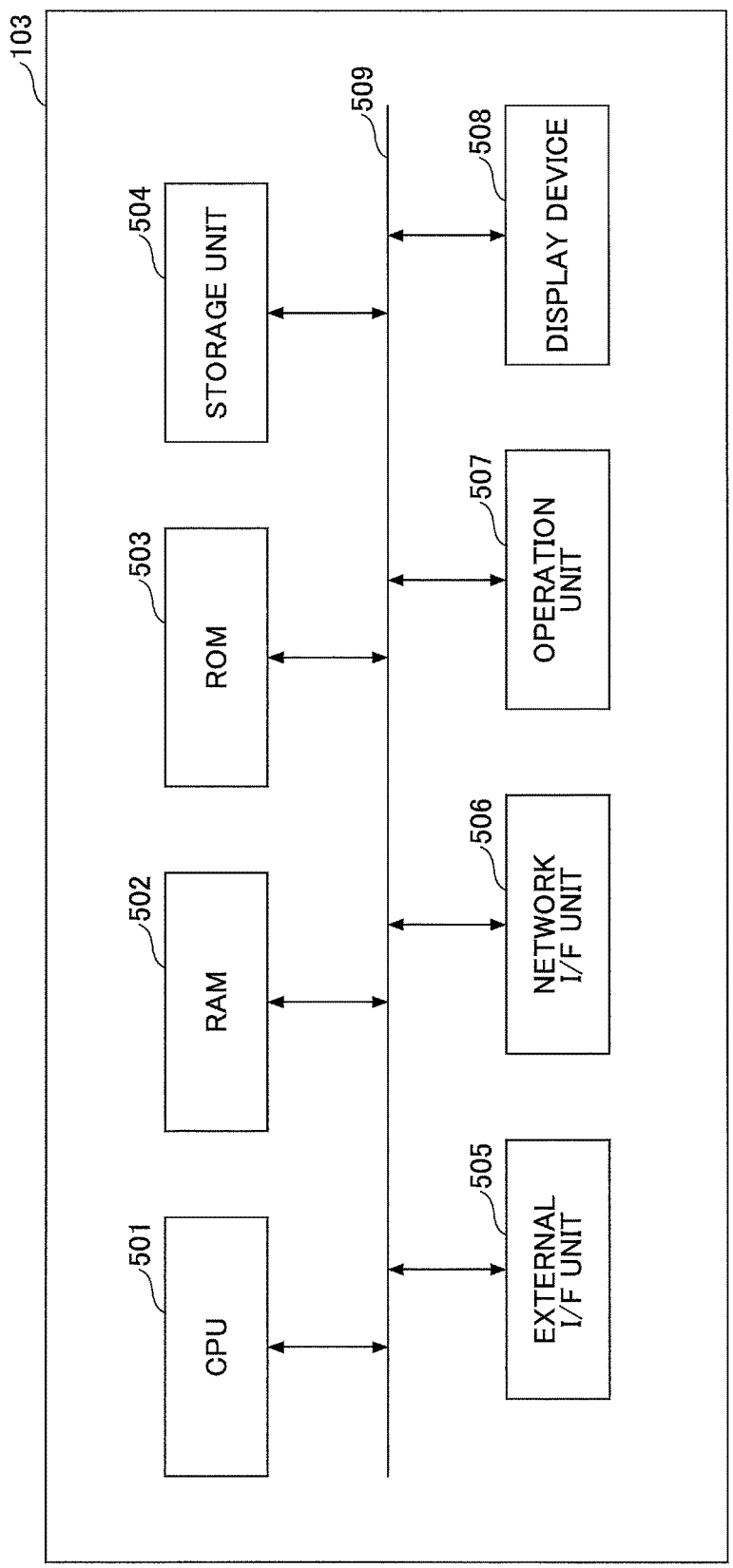
FIG. 5 is a block diagram illustrating an example functional configuration of a display apparatus according to an aspect of the present invention.

FIG. 5 is a block diagram illustrating an example hardware configuration of the display apparatus 103 according to an embodiment of the present invention. The display apparatus 103 may be configured as a general computer including, for example, a CPU 501, a RAM 502, a ROM 503, a storage unit 504, the external I/F unit 505, a network I/F unit 506, an operation unit 507, a display device 508, and a bus 509. Note that the configuration of the display apparatus 103 according to the present embodiment may be substantially identical to that of the information terminal 101 illustrated in FIG. 2, and as such, the following descriptions mainly focus on features of the display apparatus 103 that differ from those of the information terminal 101 according to the present embodiment.

The operation unit 507 includes an input unit such as an operation button and/or an operation panel that accepts operations on the display apparatus 103.

The display device 508 is hardware for displaying an image. For example, when the display apparatus 103 corresponds to a projector, the display device 508 may be a light source, a display element, or projection lens for projecting an image on a projection surface.

<Functional Configuration>

Figure 6:
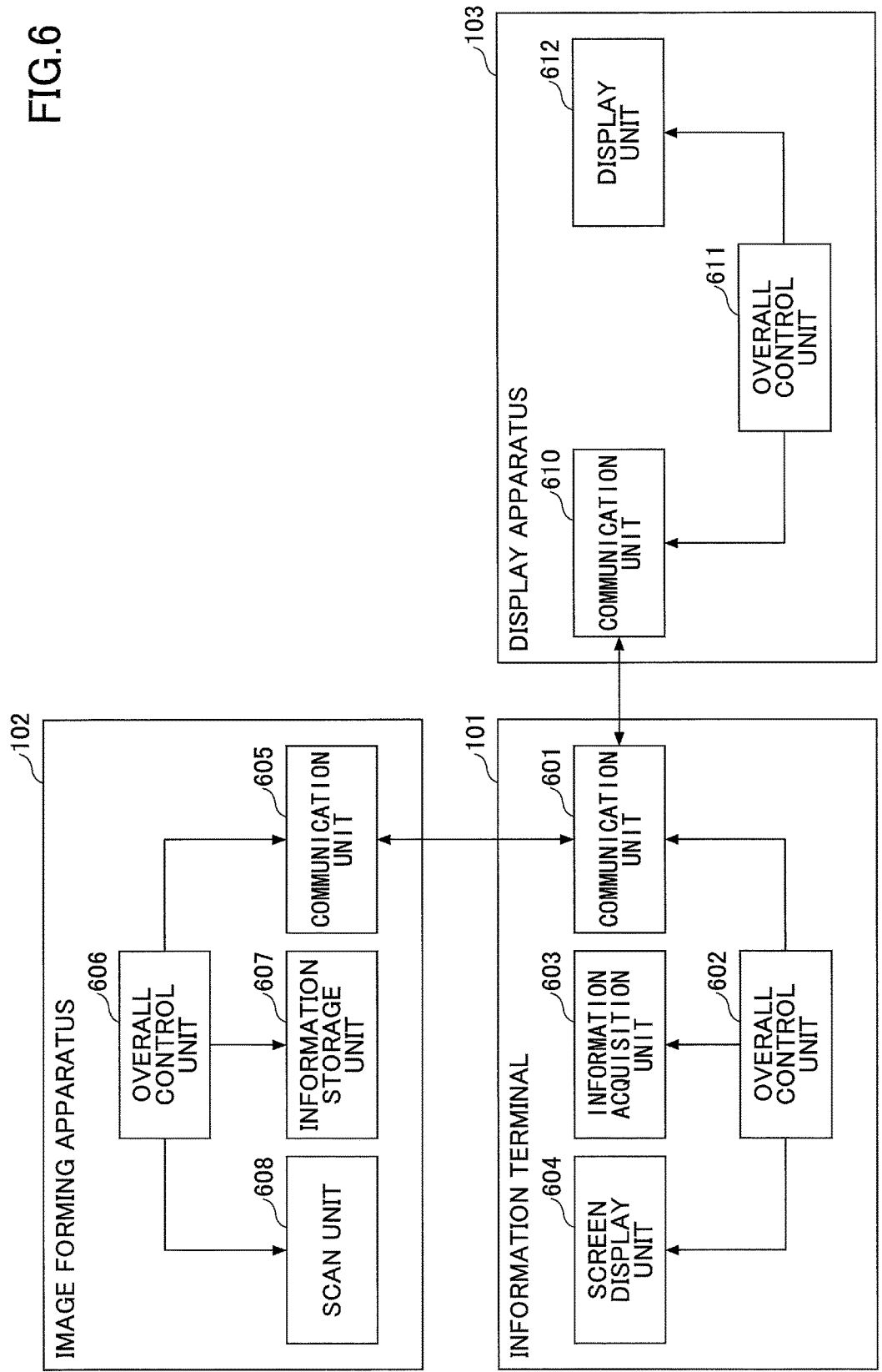
FIG. 6 is a block diagram illustrating an example functional configuration of the image processing system.

FIG. 6 is a block diagram illustrating an example functional configuration of the image processing system 100 according to an embodiment of the present invention.

(Information Terminal Functional Configuration)

The information terminal 101 includes a communication unit 601, an overall control unit 602, an information acquisition unit 603, and a screen display unit 604.

The communication unit 601 establishes communication with the image forming apparatus 102 and/or the display apparatus 103, and may be implemented by the network I/F unit 306 of FIG. 3, for example. The information terminal 101 may transmit/receive image data, transmit request information, and receive error information via the communication unit 601, for example.

The overall control unit 602 performs overall control of the information terminal 101 including the communication unit 601, the information acquisition unit 603, and the screen display unit 604. The overall control unit 602 may be implemented by a program that is executed by the CPU 301 of FIG. 3, for example.

Figure 7:
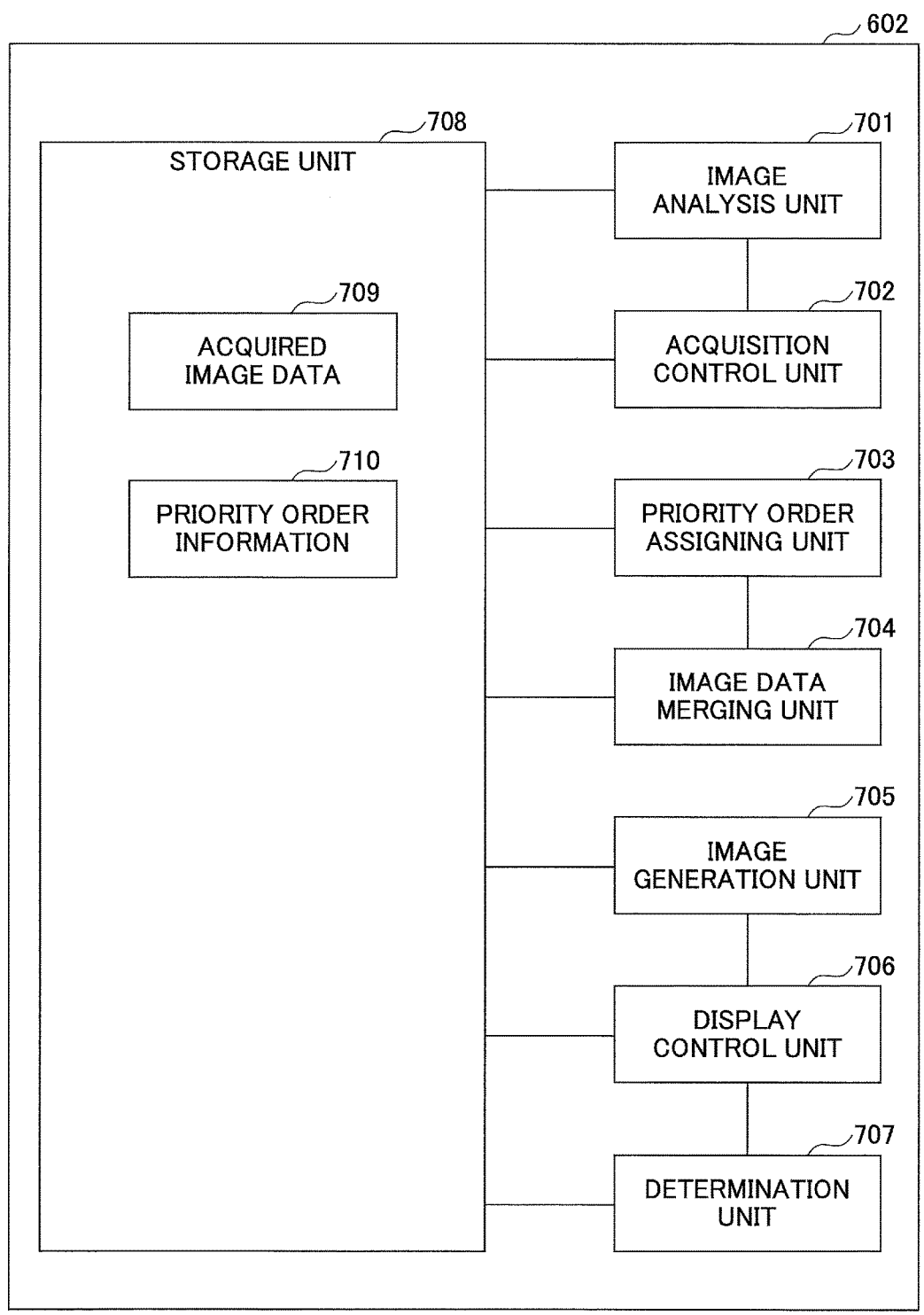
FIG. 7 is a block diagram illustrating an example functional configuration of an overall control unit of the information terminal.

FIG. 7 is a block diagram illustrating an example functional configuration of the overall control unit 602 of the information terminal 101 according to an example embodiment. In FIG. 7, the overall control unit 602 includes an image analysis unit 701, an acquisition control unit 702, a priority order assigning unit 703, an image data merging unit 704, an image generation unit 705, a display control unit 706, a determination unit 707, and a storage unit 708.

The image analysis unit 701 analyzes image data acquired by the acquisition control unit 702 and acquires image information of the image data. For example, the image analysis unit 701 may perform an OCR (Optical Character recognition) process on image data to analyze the image data and acquire information relating to characters included in the image data. Note that information relating to characters included in image data may include information on the size of characters included in the image data and/or information on the number of characters included in the image data, for example. When the number of characters included in image data is greater than a predetermined number, for example, the information terminal 101 may determine that an area occupied by one character is relatively small. In this way, the information terminal 101 may determine that relatively small characters are included in the image data, for example. Also, the image analysis unit 701 may acquire image information relating to the data size and/or the resolution of the image data, for example.

The acquisition control unit 702 uses an image acquisition unit (e.g., the image forming apparatus 102) to acquire image data of an image to be displayed in a plurality of different data formats. For example, the acquisition control unit 702 may request the image forming apparatus 102 to sequentially scan a document that is set in the image forming apparatus 102 to generate a plurality of image data sets in a plurality of different data formats supported by the image forming apparatus 102, and acquire the plurality of image data sets in the plurality of different data formats from the image forming apparatus 102.

The priority order assigning unit 703 assigns a priority order to each of the plurality of image data sets acquired in the plurality of different data formats by the acquisition control unit 702. For example, the priority assigning unit 703 may assign a priority order to each image data set based on at least one of image format information, resolution information, color mode (color/black & white) information, color depth information, and data size information of the image data that is included in priority information 710 stored in the storage unit 708.

The image data merging unit 704 merges the plurality of image data sets acquired in the plurality of different data formats by the acquisition control unit 702 into a single file. Alternatively, the image data merging unit 704 may merge the plurality of image data sets acquired in the plurality of different data formats by the acquisition control unit 702 that are assigned a priority order by the priority order assigning unit 703 into a single file.

The image generation unit 705 generates image data in a data format compatible with the display apparatus 103 in a case where the plurality of image data sets acquired in the plurality of different data formats by the acquisition control unit 702 does not include image data in the data format compatible with the display apparatus 103. For example, the image generation unit 705 may generate image data in a data format compatible with the display apparatus 103 by changing the image format, the resolution, the color depth, or the like of at least one of the plurality of image data sets acquired in the plurality of different data formats by the acquisition control unit 702. Alternatively, the image generation unit 705 may use at least one image data set of the plurality of image data sets acquired in the plurality of different data formats by the acquisition control unit 702 to perform an image process, such as image enlargement, image reduction, or smoothing, to generate image data displayable by the display apparatus 103, for example.

The display control unit 706 controls the display apparatus 103 to display image data. For example, the display control unit 706 may send display request information including image data to be displayed to the display apparatus 103 to request the display apparatus 103 to display the image data. In other examples, the image data to be displayed may be sent to the display control unit 706 to request the display apparatus 103 to display the image data.

The determination unit 707 determines one image data set of an image to be displayed by the display apparatus 103 from among the plurality of image data sets acquired in the plurality of different data formats by the acquisition control unit 702, based on the display apparatus 103 that will display the image. For example, the determination unit 707 may sequentially send the plurality of image data sets acquired in the plurality of different data formats by the acquisition control unit 702 to the display apparatus 103 until the display apparatus 103 is able to display the image data. Then, the determination unit 707 may determine that the image data that could be displayed by the display apparatus 103 (image data in a data format compatible with the display apparatus 103) corresponds to the one image data set to be displayed by the display apparatus 103. Alternatively, the determination unit 707 may determine the one image data set to be displayed by the display apparatus 103 from among the plurality of image data sets acquired in the plurality of different data formats by the acquisition control unit 702 based on information on a data format compatible with the display apparatus 103, for example.

The storage unit 708 stores various types of information and data including acquired image data 709 acquired by the acquisition control unit 702 and priority order information 710 used by the priority order assigning unit 703 in assigning a priority order to image data, for example. The storage unit 708 may be implemented by the storage unit 304 of FIG. 3, for example.

Referring back to FIG. 6, the other functional elements of the information terminal 101 are described below.

The information acquisition unit 603 of the information terminal 101 acquires information from the image forming apparatus 102 and the display apparatus 103, and may be implemented by a program executed by the CPU 301 of FIG. 3. For example, the information acquisition unit 603 may acquire from the image forming apparatus 102, device information including data formats supported by the image forming apparatus 102 (i.e., data formats into which the image forming apparatus 102 can scan an image), scanning functions of the image forming apparatus 102, and setting values of the image forming apparatus 102. Also, the information acquisition unit 603 may acquire from the display apparatus 103, device information including the image format, resolution, color depth, and data size displayable by the display apparatus 103, for example.

The screen display unit 604 is a user interface that receives user input and displays a screen. The screen display unit 604 may be implemented by the display/input unit 308 and a program executed by the CPU 301 of FIG. 3, for example. A user may input a scan command to the image forming apparatus 102 or a display command to the display apparatus 103 via the screen display unit 604, for example.

(Image Forming Apparatus Functional Configuration)

In FIG. 6, the image forming apparatus 102 includes a communication unit 605, an overall control unit 606, an information storage unit 607, and a scan unit 608.

The communication unit 605 establishes communication with the information terminal 101 and the like and may be implemented by the network I/F unit 415 of FIG. 4, for example. The image forming apparatus 102 may receive request information and transmit image data and device information to the information terminal 101 via the communication unit 605, for example.

The overall control unit 606 performs overall control of the image forming apparatus 102 including the communication unit 605, the information storage unit 607, and the scan unit 608. The overall control unit 606 may be implemented by a program executed by the CPU 409 of FIG. 4, for example.

The information storage unit 607 stores device information including scanning functions and setting values, for example, that can be provide to the information terminal 101 upon request. The information storage unit 607 may be implemented by the storage unit 406 and the ROM 411 of FIG. 4, for example.

The scan unit 608 performs operations such as scanning a document set to a document scanning unit or an ADF (Auto Document Feeder) of the image forming apparatus 102, performing an image conversion process, and transmitting scanned image data to the information terminal 101, for example. The scan unit 608 may be implemented by the image scanning unit 402, the image process/engine control unit 404, and a program executed by the CPU 409 of FIG. 4, for example.

With the above configuration, when the image forming apparatus 102 receives an image data acquisition request from the information terminal 101, the image forming apparatus 102 may determine whether the received image data acquisition request corresponds to a request for image data to be transmitted to the display apparatus 103 (as an example of an apparatus other than the information terminal 101). Further, in the case where the image forming apparatus 102 determines that the received image data acquisition request corresponds to a request for image data to be transmitted to the display apparatus 103, the image forming apparatus 102 may generate image data in a plurality of data formats and transmit the generated image data in the plurality of data formats to the information terminal 101.

(Display Apparatus Functional Configuration)

In FIG. 6, the display apparatus 103 includes a communication unit 610, an overall control unit 611, and a display unit 612.

The communication unit 610 establishes communication with the information terminal 101 or the like and may be implemented by the network I/F unit 506 of FIG. 5, for example. The display apparatus 103 may receive request information or image data, and transmit error information via the communication unit 610, for example.

The overall control unit 611 performs overall control of the display apparatus 103 including the communication unit 610 and the display unit 612. The overall control unit 611 may be implemented by a program executed by the CPU 501 of FIG. 5, for example.

The display unit 612 displays (projects) an image based on image data transmitted from the information terminal 101 or the like and may be implemented by the display device 508 of FIG. 5, for example.

Process Flow

First Embodiment (Image Acquisition Process)

Figure 8:
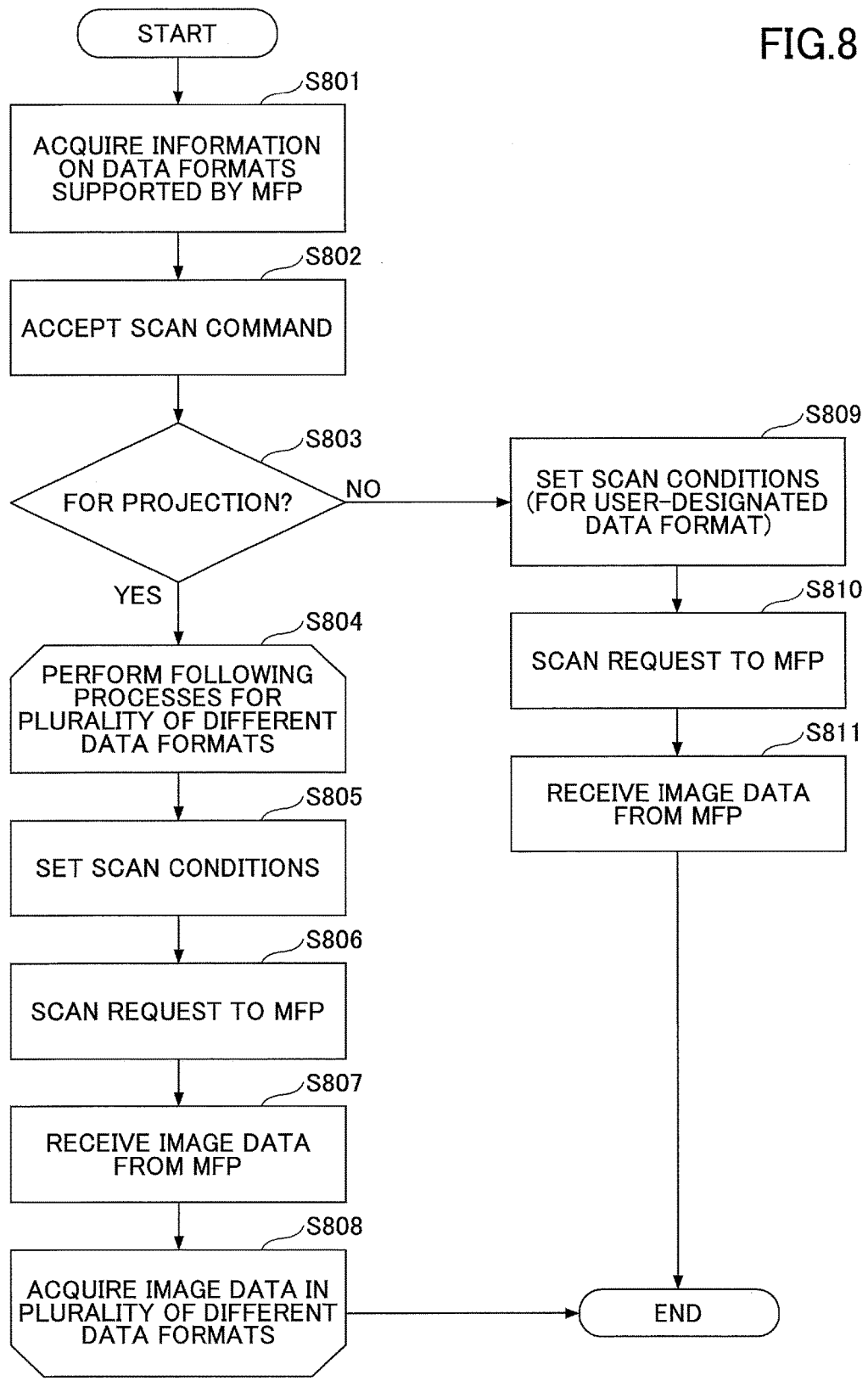
FIG. 8 is a flowchart illustrating an image acquisition process according to a first embodiment of the present invention.

FIG. 8 is a flowchart illustrating an image acquisition process according to a first embodiment of the present invention. Note that in the present embodiment, it is assumed that the image forming apparatus 102 is an MFP, and the display apparatus 103 is a projector. However, the scope of the present invention is not limited to the present embodiment.

For example, when the image acquisition process is started by activating a predetermined app of the information terminal 101, the information acquisition unit 603 of the information terminal 101 acquires information on data formats for image data that can be acquired from the MFP (data formats supported by the MFP) (step S801).

The information terminal 101 uses a user interface displayed at the screen display unit 604 to accept a scan command (scan request) from the user (step S802). Then the information terminal 101 determines whether the scan command corresponds to a scan command for image projection by a projector (step S803). For example, the user interface displayed at the screen display unit 604 may include a component (e.g., operation button) for accepting a normal scan command and a component for accepting a scan command for image projection by a projector.

Figure 9:
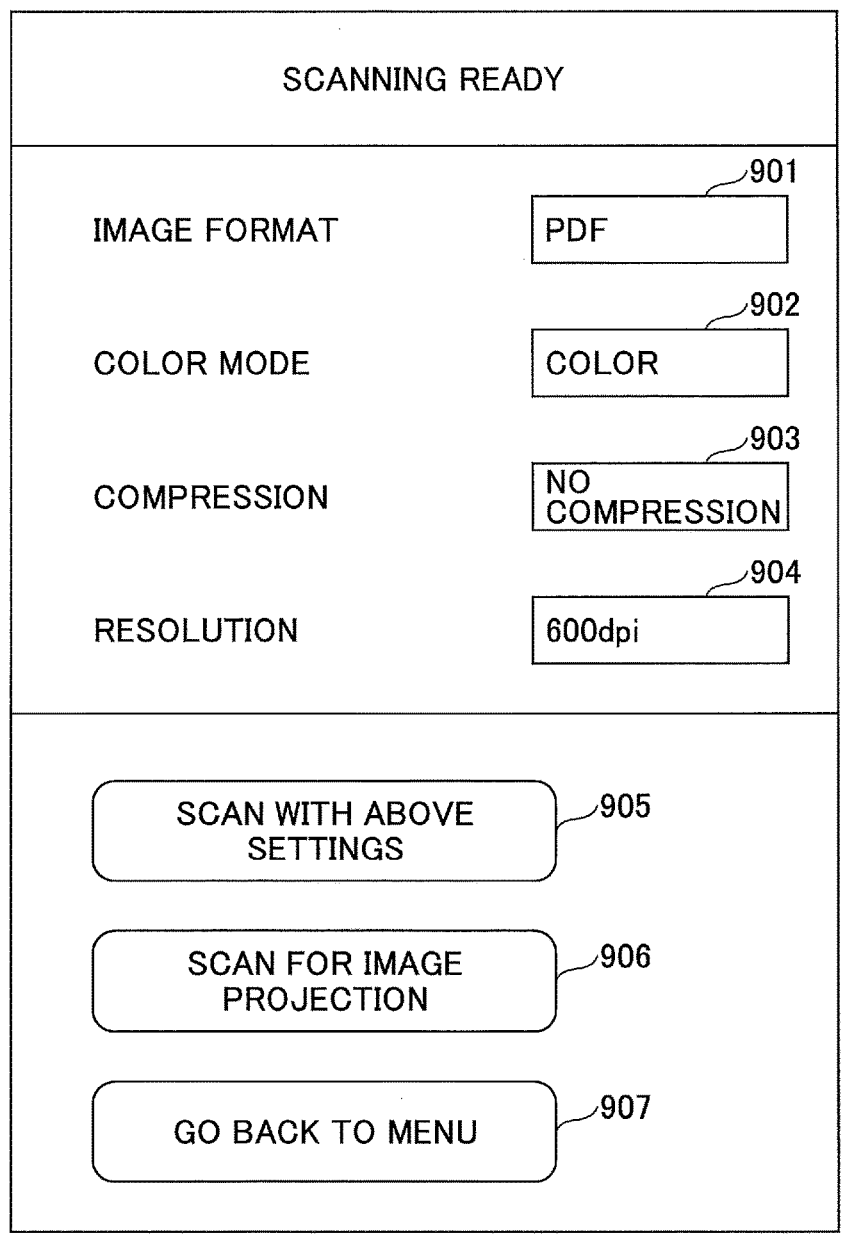
FIG. 9 is a diagram illustrating an example scan screen according to the first embodiment.

FIG. 9 illustrates an example of a scan screen according to the first embodiment. The information terminal 101 may display the scan screen 900 as illustrated in FIG. 9 at the screen display unit 604 to accept a scan command from the user, for example. In the example of FIG. 9, the scan screen 900 includes setting fields such as an image format setting field 901, a color mode setting field 902, a compression setting field 903, and a resolution setting field 904. The user may enter desired settings in these setting fields and press (touch) a "scan with above settings" button 905 to direct the MFP to perform a normal scanning process.

Also, the user may press (touch) a "scan for image projection" button 906 to direct the MFP to scan (acquire) an image for projection by a projector (projection image). Note that the "scan for image projection" button 906 is an example of an accepting unit that accepts a projection image acquisition request from a user.

Referring back to FIG. 8, subsequent processes of the image acquisition process are described.

When the "scan for image projection" button 906 of FIG. 9 is pressed in step S802, for example, the information terminal 101 determines that a scan command for image projection by a projector has been accepted and thereby proceeds to step S804. On the other hand, when the "scan with the above settings" button 905 of FIG. 9 is pressed in step S802, for example, the information terminal 101 determines that the scan command that has been accepted is not a scan command for image projection by a projector and thereby proceeds to step S809.

Upon proceeding to step S804, the acquisition control unit 702 of the information terminal 101 performs the following processes of steps S805-S807 for each of the different data formats in which the MFP is capable of scanning/acquiring image data to thereby acquire image data in the different data formats.

In step S805, the acquisition control unit 702 sets up scan conditions corresponding to the data format in which image data is to be acquired. In step S806, the acquisition control unit 702 sends a scan request to the MFP. In step S807, the acquisition control unit 702 receives image data from the MFP, and stores the received image data as the acquired image data 709 in the storage unit 708, for example.

After the processes of steps S805-S807 are executed for each of the plurality of different data formats in which the MFP is capable of acquiring/scanning image data, the information terminal 101 ends the image acquisition process (step S808).

On the other hand, if the process proceeds to step S809, the acquisition control unit 702 performs a normal scanning process. For example, the acquisition control unit 702 of the information terminal 101 sends a scan command designating the scan conditions designated in the setting fields of FIG. 9 to the MFP and requests the MFP to perform scanning according to the designated settings (step S810). Then, the acquisition control unit 702 receives image data from the MFP, and stores the received image data as the acquired image data 709 in the storage unit 708, for example (step S811).

By executing the above-described processes, when the information terminal 101 receives a request for image data to be projected by a projector from a user, the information terminal 101 may acquire image data of an image to be displayed in a plurality of different data formats.

(Image Projection Process)

Figure 10:
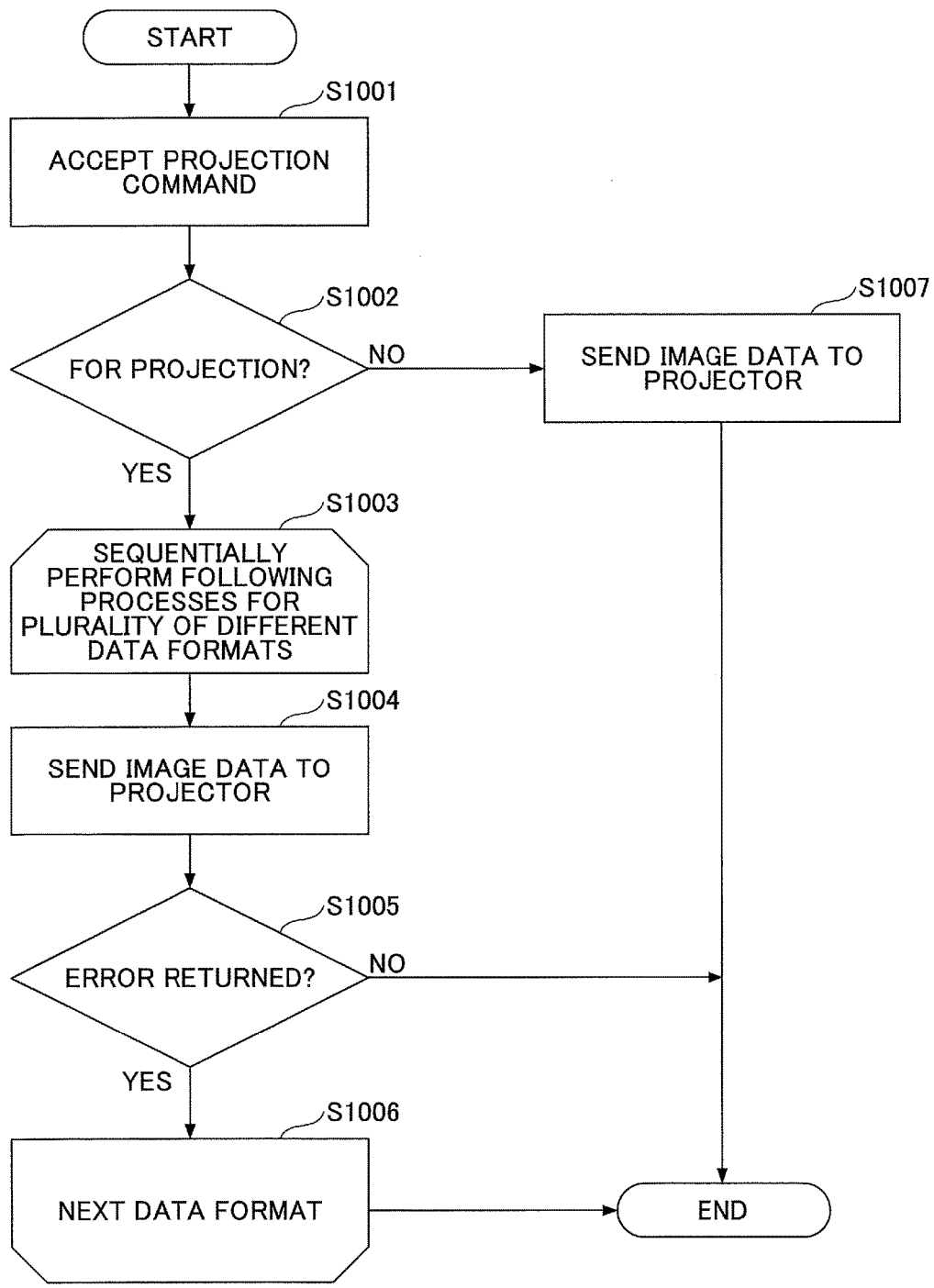
FIG. 10 is a flowchart illustrating an image projection process according to the first embodiment.

FIG. 10 is a flowchart illustrating an image projection process according to the first embodiment.

For example, when the information terminal 101 accepts a projection command to project the image data acquired by the image acquisition process of FIG. 8 (step S1001), the information terminal 101 determines whether image data designated by the projection command corresponds to image data for projection (S1002). Note that image data for projection may correspond to image data in a plurality of different data formats acquired by the processes of steps S804-S808 of FIG. 8, for example.

In step S1002, if it is determined that the image data designated by the projection command does not correspond to image data for projection, the display control unit 706 of the information terminal 101 performs a normal projection process that involves transmitting the designated image data to a projector (step S1007) and terminates the image projection process.

On the other hand, if it is determined in step S1002 that the image data designated by the projection command corresponds to image data for projection, the information terminal 101 proceeds to step S1003.

Upon proceeding to step S1003, the determination unit 707 of the information terminal 101 uses the display control unit 706 to sequentially execute the processes of steps S1004 and S1005 with respect to the image data in the plurality of different data formats designated in the projection command.

In step S1004, the determination unit 707 sends one image data set in one data format from among the plurality of different data formats to the projector. In step S1005, the determination unit 707 determines whether an error has been returned from the projector within a predetermined time period, for example. In the present embodiment, it is assumed that the projector sends an error to the information terminal 101 when it receives an image file in a data format that is not displayable by the projector. On the other hand, if the projector receives an image file in a data format displayable by the projector, the projector does not send an error to the information terminal 101 and simply displays the received image data.

In step S1005, if an error is received from the display apparatus 103, the determination unit 707 executes the processes of steps S1004 and S1005 with respect to a next set of image data in a next data format (step S1006). On the other hand, in step S1005, if an error is not received from the display apparatus 103 within a predetermined time period, for example, the determination unit 707 determines that the image data that has been sent to the display apparatus 103 corresponds to the one image data set to be displayed by the display apparatus 103 and terminates the image projection process.

By executing the above-described processes, when the information terminal 101 receives a request for projecting image data (projection request) from a user, the information terminal 101 may sequentially send image data acquired in a plurality of different data formats to a projector until the projector is able to project (display) the image data. In this way, the information terminal 101 may determine the one image data set to be displayed (projected) by the projector from among the plurality of image data sets acquired in the plurality of different data formats from the MFP. In this case, the one image data set determined by information terminal 101 is displayed by the projector.

Second Embodiment

According to a second embodiment of the present invention as described below, the information terminal 101 merges the plurality of image data sets acquired in the plurality of different data formats from the MFP into a single file.

Figure 11:
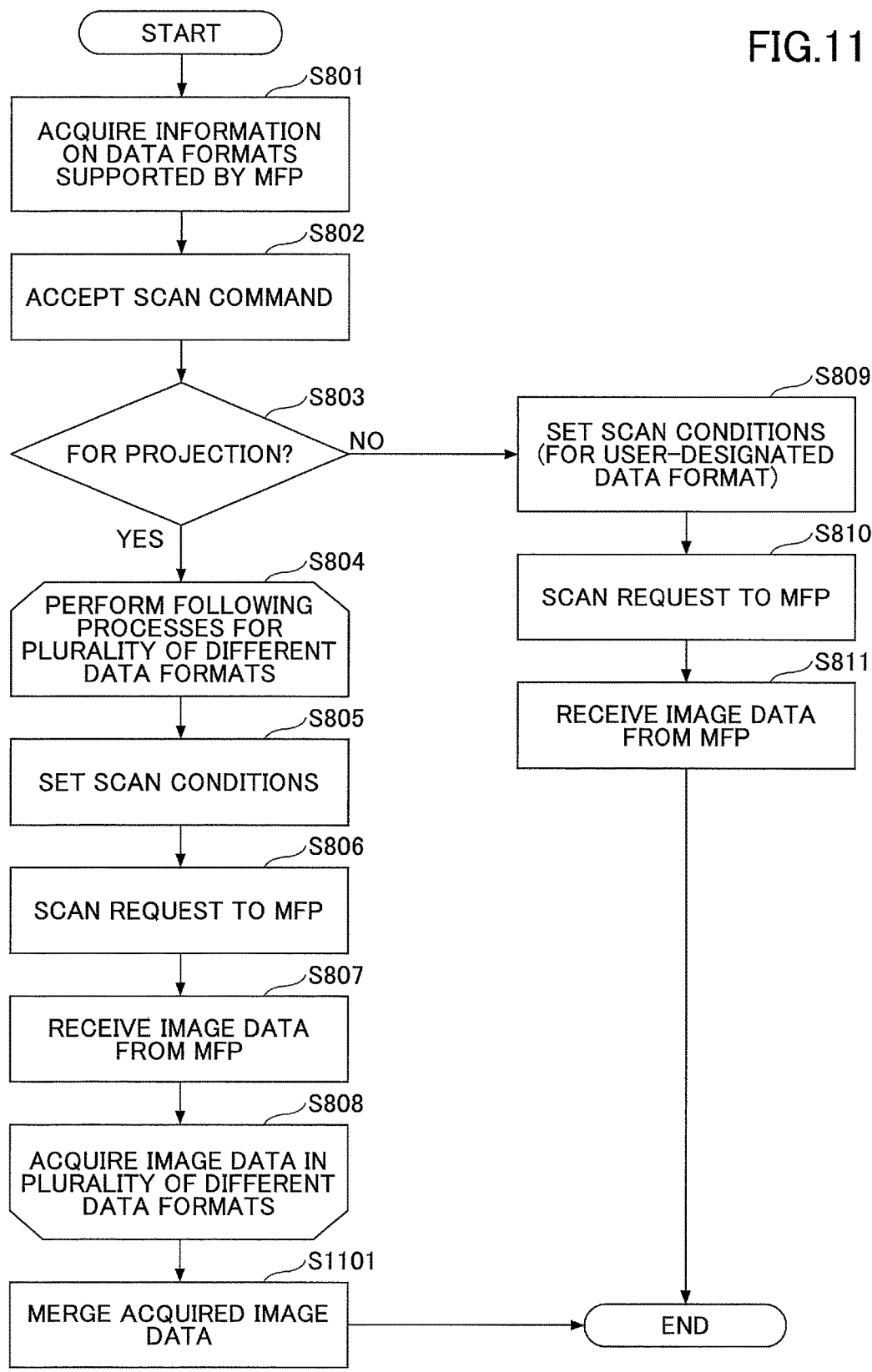
FIG. 11 is a flowchart illustrating an image acquisition process according to a second embodiment of the present invention.

FIG. 11 is a flowchart illustrating the image acquisition process according to the second embodiment. Note that the processes of steps S801-S811 in FIG. 11 are substantially identical to those of the image acquisition process according to the first embodiment as illustrated in FIG. 8 such that descriptions thereof are omitted. The following descriptions focus on features of the second embodiment that differ from the first embodiment.

According to the first embodiment, image data in a plurality of different data formats acquired in steps S804-S808 are stored in the storage unit 708 and the image acquisition process is terminated. On the other hand, in the present embodiment, after acquiring image data in a plurality of different data formats, the process proceeds to step S1101, where the image data acquired in the plurality of different data formats are merged into a single file. For example, the image data merging unit 704 of the information terminal 101 merges the image data acquired in the plurality of different data formats by the acquisition control unit 702 into a single file.

Figure 12:
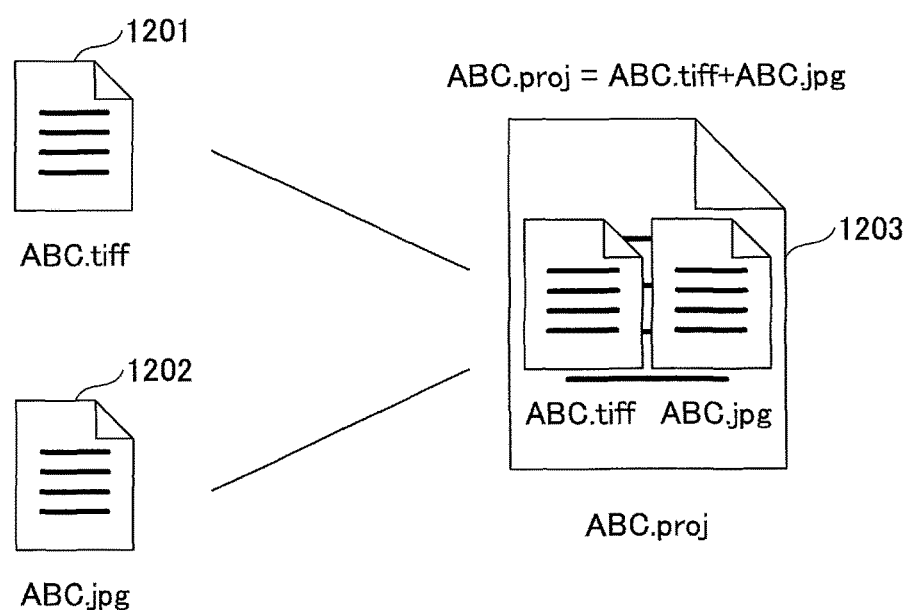
FIG. 12 is a diagram illustrating merging of image data according to the second embodiment.

FIG. 12 illustrates the merging of image data according to the second embodiment. In the present example, for the sake of simplifying the descriptions, it is assumed that the plurality of image data sets acquired in the plurality of different data formats include image data in the JPEG format and image data in the TIFF format. In this case, the acquisition control unit 702 may acquire two image data sets including a TIFF file (ABC.tiff) 1201 and a JPEG file (ABC.jpg) 1202 as illustrated in FIG. 12, for example. Accordingly, the image data merging unit 704 may merge the two image data sets acquired in different image formats into a single merged file (ABC.proj) 1203.

Note that the format of the merged file 1203 may be in any file format as long as the plurality of image data sets merged into the merged file 1203 can be selectively extracted from the merged file 1203. For example, the file format of the merged file 1203 may be a file in a general ZIP format or a file in a special file format.

Also, in a preferred embodiment, the information terminal 101 assigns a priority order to each of the plurality of image data sets in the plurality of different data formats that are merged into the merged file 1203.

Figure 13:
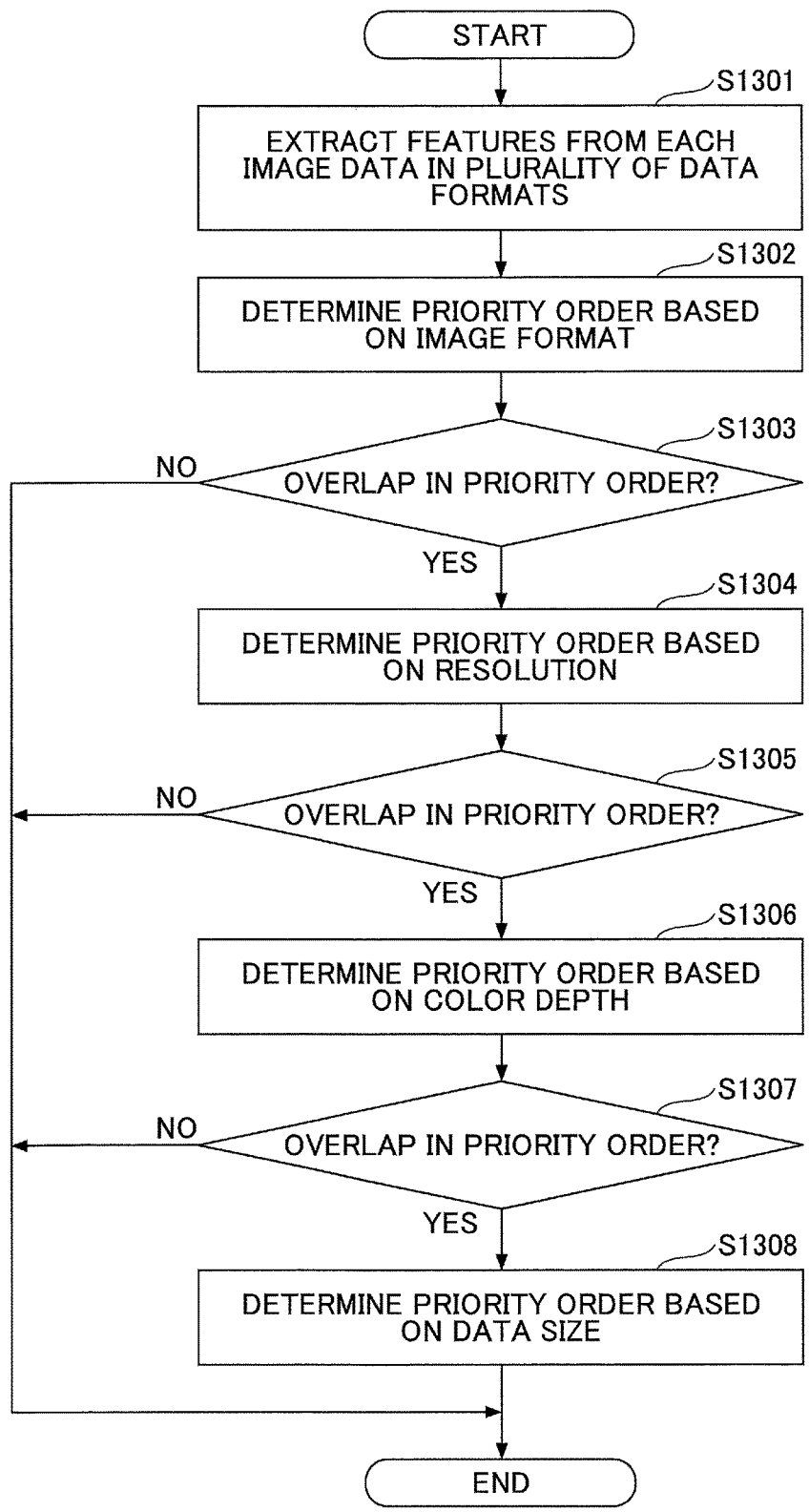
FIG. 13 is a flowchart illustrating a priority order assigning process according to the second embodiment.

FIG. 13 is a flowchart illustrating a priority order assigning process according to the second embodiment.

When the information terminal 101 starts the priority order assigning process, for example, the image analysis unit 701 may extract features from each of the plurality of image data sets in the plurality of different data formats (step S1301). Note that features extracted from the image data correspond to information on characteristic features of the image data such as image format information, resolution information, color mode (color/black & white) information, color depth information, and/or data size information of the image data. In the present example, it is assumed that the extracted features include image format information (TIFF, JPEG, etc.), resolution information, color depth information, and data size information of the image data. However, this is merely an illustrative example and is not intended to limit the scope of the present invention.

In step S1302, the priority order assigning unit 703 of the information terminal 101 determines the priority order for the plurality of image data sets in the plurality of different data formats based on the image format information of the image data. For example, the priority information 710 stored in the storage unit 708 of the information terminal 101 may include information for determining the priority order based on the image format of the image data such as "TIFF>GIF>JPEG". This example indicates that TIFF has the highest priority, followed by GIF, and then JPEG.

In step S1303, the information terminal 101 determines whether there is an overlap in the priority order, and if there is no overlap, the information terminal 101 terminates the priority order assigning process. On the other hand, if the information terminal 101 determines that there is an overlap in the priority order in step S1303 (e.g., in a case where the image data sets in the plurality of different data formats include more than one image data set in the same image format), the process proceeds to step S1304.

In step S1304, the priority order assigning unit 703 of the information terminal 101 determines the priority order of the plurality of image data sets in the plurality of different data formats based on the resolution information of the image data. For example, the priority information 710 stored in the storage unit 708 of the information terminal 101 may include information for determining the priority order based on the resolution of the image data such as "600 dpi>300 dpi>150 dpi". This example indicates that 600 dpi has the highest priority, followed by 300 dpi, and then 150 dpi.

In step S1305, the information terminal 101 determines whether there is an overlap in the priority order, and if there is no overlap, the information terminal 101 terminates the priority order assigning process. On the other hand, if the information terminal 101 determines that there is an overlap in the priority order in step S1305, the process proceeds to step S1306.

In step S1306, the priority order assigning unit 703 of the information terminal 101 determines the priority order of the plurality of image data sets in the plurality of different data formats based on the color depth information of the image data. For example, the priority information 710 stored in the storage unit 708 of the information terminal 101 may include information for determining the priority order based on the color depth of the image data such as "32-bit>16-bit>8-bit". This example indicates that 32-bit has the highest priority, followed by 16-bit, and then 8-bit. Also, in some embodiments, color mode information (color/black & white) of the image data may be used in place of (or in addition to) the color depth information of the image data in determining the priority order.

In step S1307, the information terminal 101 determines whether there is an overlap in the priority order, and if there is no overlap, the information terminal 101 terminates the priority assigning process. On the other hand, if the information terminal 101 determines that there is an overlap in the priority order in step S1307, the process proceeds to step S1308.

In step S1308, the priority order assigning unit 703 of the information terminal 101 determines a priority order of the plurality of image data sets in the plurality of different data formats based on the data size information of the image data. For example, the priority information 710 stored in the storage unit 708 of the information terminal 101 may include information for determining the priority order based on the data size of the image data such as "Small Data Size>Large Data Size". This example indicates that a smaller data size has priority over a larger data size.

Note that the priority assigning process illustrated in FIG. 13 is only an illustrative example and is not intended to limit the scope of the present invention. That is, a priority order may be assigned to a plurality of image data sets based on a given feature of the image data in a manner different from the process illustrated in FIG. 13.

As described above, according to the present embodiment, the information terminal 101 merges the plurality of image data sets in the plurality of different data formats acquired from the MFP into a single file, and in this way, handling and management of the image data in the plurality of different data formats may be facilitated.

For example, in FIG. 2, the projector A 202 and the projector B 203 may be manufactured by different manufacturers, or be different models, for example, and as such, the projector A 202 and the projector B 203 may project image data in different image formats and at different resolutions, for example. Even in such a case, the information terminal 101 may be able to easily control both the projector A 202 and the projector B 203 to project an image to be displayed using a one merged file as described above.

Also, preferably, the information terminal 101 assigns a priority order to each of the plurality of image data sets in the plurality of different data formats. For example, in assigning the priority order to the plurality of image data sets in the plurality of different data formats, the image processing system 100 may assign a higher priority to image data with better image quality and sequentially send the image data with higher priority to the projector. In this way, image data with better image quality may be projected by the projector.

Third Embodiment

According to a third embodiment of the present invention as described below, the MFP determines the number of characters included in a document subject to image data acquisition (document to be scanned), and different processes are performed depending on the determination result.

For example, when a relatively large number of small characters are included in the document from which the MFP is to acquire image data, the outline of the characters in the document may be distorted and become visually compromised upon being projected in a case where image data of the document is acquired using JPEG or some other lossy compression method, or in a case where the image data is acquired at a relatively low resolution, for example. Thus, in the present embodiment, information relating to the characters included in the document (e.g., character size, number of characters) is analyzed, and image data of the document may be acquired in a plurality of different data formats based on the information on the characters such as the character size and/or the number of characters included in the document.

Figure 14:
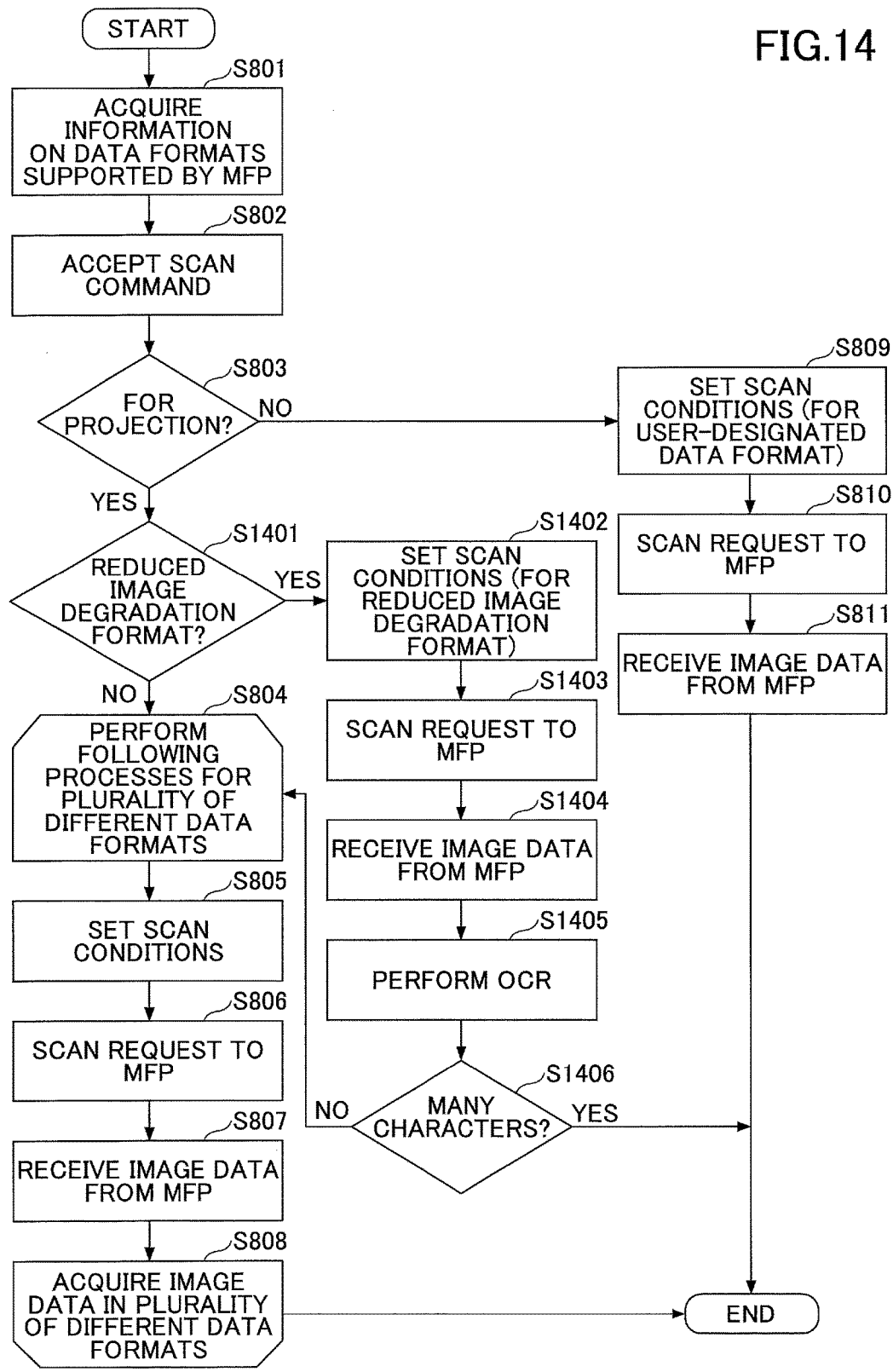
FIG. 14 is a flowchart illustrating an image acquisition process according to a third embodiment of the present invention.

FIG. 14 is a flowchart illustrating the image acquisition process according to the third embodiment. Note that the processes of steps S801-S811 in FIG. 14 are substantially identical to those of the image acquisition process according to the first embodiment illustrated in FIG. 8 such that descriptions thereof are omitted. The following descriptions focus on features of the third embodiment that differ from the first embodiment (i.e., steps S1401-S1406).

According to the present embodiment, when it is determined in step S803 that the scan command that has been accepted is for image projection, the process proceeds to step S1401 where the information terminal 101 determines whether the MFP supports an image format with reduced image degradation (reduced image degradation format). Note that an image format with reduced image degradation refers to an image format that results in little or no image degradation such as a non-compressed image format, or a lossless compression image format, which enables original image data to be reconstructed from compressed image data, for example.

In step S1401, if it is determined that the MFP supports an image format with reduced image degradation, the process proceeds to step S1402.

Upon proceeding to step S1402, the acquisition control unit 702 sets up scan conditions for acquiring image data in a reduced image degradation format (e.g., non-compression format such as the TIFF format). Then, the acquisition control unit 702 requests the MFP to perform scanning according to the designated scan conditions by sending a scan command to the MFP (step S1403). Then, the acquisition control unit 702 receives the resulting scanned image data from the MFP (step S1404).

The image analysis unit 701 of the information terminal 101 performs an OCR process on the image data received from the MFP, and analyzes the number of characters included in the image data, for example (step S1405). Further, acquisition control unit 702 of the information terminal 101 determines whether the number of characters included in the image data is greater than a predetermined threshold value, for example (step S1406).

In step S1406, if it is determined that the number of characters included in the image data is less than the predetermined threshold value, the process proceeds to step S804 where the acquisition control unit 702 acquires the image data in the plurality of different data formats. On the other hand, if it is determined in step S1406 that the number of characters included in the image data is greater than the predetermined threshold value, the image acquisition process is terminated and the image data received in step S1404 is used as image data for projection.

Note that in steps S1405 and S1406, the character size may be analyzed instead of the number of characters included in the image data, for example. In this case, if the image data includes characters in a size smaller than a predetermined character size, the image acquisition process may be terminated without acquiring the image data in the plurality of different data formats, for example.

By executing the above-described processes, when a large number of characters are included in an image to be displayed, or when the image to be displayed includes small characters, the information terminal 101 may acquire image data of the image to be displayed in a data format with reduced image degradation and refrain from acquiring the image data in the plurality of different data formats. In this way, accumulation of undesirable image data with distorted characters that are visually compromised may be prevented and the storage space of the information terminal 101 may be effectively used.

Fourth Embodiment

According to a fourth embodiment of the present invention, an image projection process as described below may be performed in a case where none of the plurality of image data sets in the plurality of different data formats can be projected by the projector in the image projection process according to the first embodiment as illustrated in FIG. 10, for example.

Figure 15:
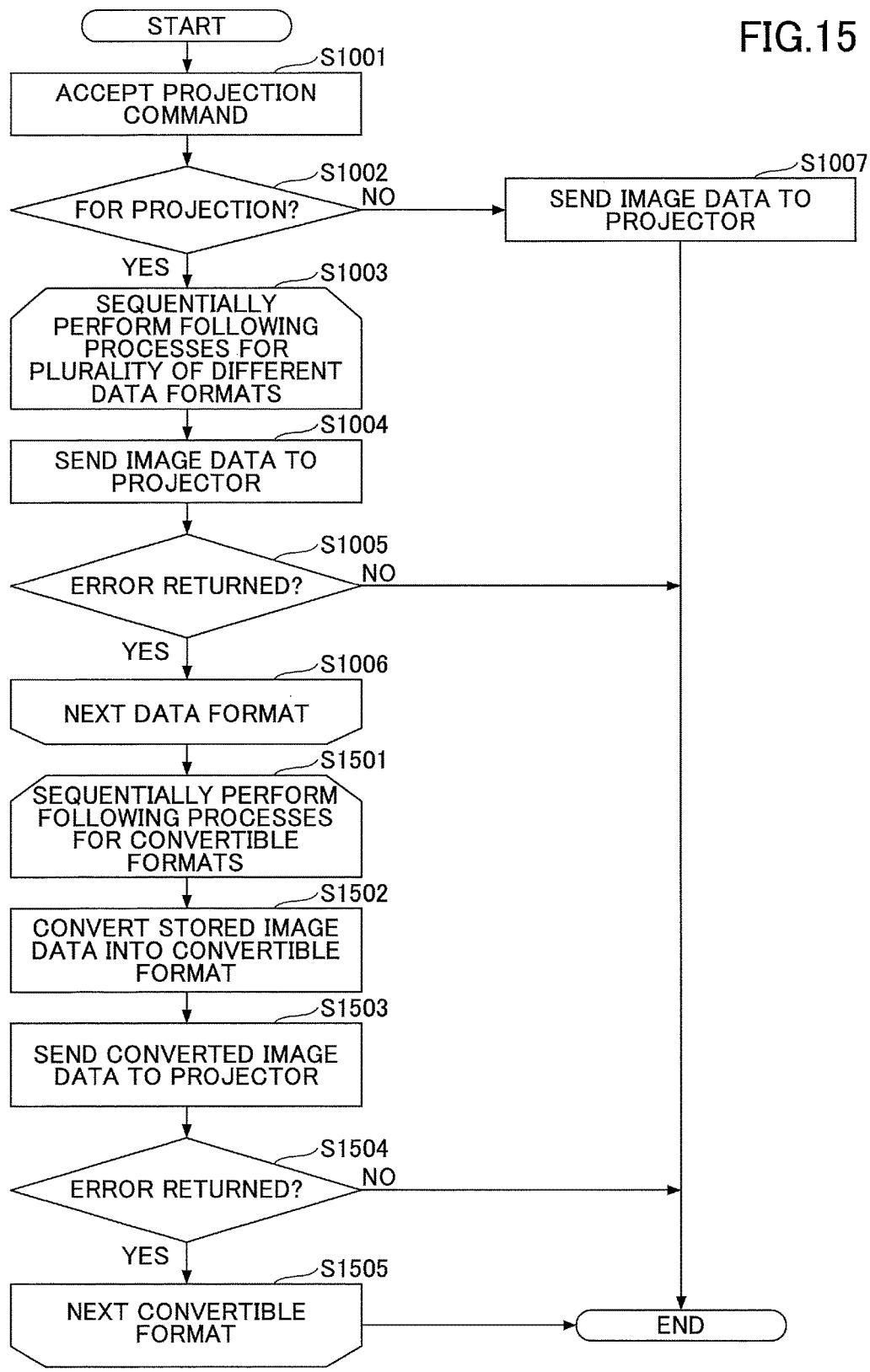
FIG. 15 is a flowchart illustrating an image projection process according to the fourth embodiment.

FIG. 15 is a flowchart illustrating the image projection process according to the fourth embodiment. Note that the processes of steps S1101-S1007 of FIG. 15 are substantially identical to those of the image projection process according to the first embodiment illustrated in FIG. 10 such that descriptions thereof are omitted. The following descriptions focus on the features of the fourth embodiment that differ from the first embodiment.

In FIG. 15, if errors are returned for all of the plurality of image data sets in the plurality of different data formats upon executing the processes of steps S1003-S1006, the process proceeds to step S1501.

Upon proceeding to step S1501, the image generation unit 705 of the information terminal 101 sequentially performs the processes of steps S1502-S1504 with respect to convertible formats into which image data can be converted until the projector is able to project the image data, or until the processes of steps S1502-S1504 are executed with respect to all convertible formats.

For example, in step S1502, the image generation unit 705 of the information terminal 101 converts one image data set from among the plurality of image data sets in the plurality of different data formats (e.g., image data in a data format with the best image quality) into a convertible format into which the image data can be converted. Then, the display control unit 706 transmits the image data in the converted data format to the projector (step S1503).

In step S1504, the information terminal 101 determines whether an error has been returned from the projector within a predetermined time period, for example, and if no error is returned within the predetermined time period, the information terminal 101 determines that the projector has been able to properly display the image data and terminates the image projection process. On the other hand, if an error is returned within the predetermined time period in step S1504, the process returns to step S1502, and one image data set from among the plurality of image data sets in the plurality of different data formats is converted into another convertible format into which the image data can be converted, and similar processes are repeated with respect to the image data in the converted data format.

Fifth Embodiment

In the image projection process according to the first embodiment as illustrated in FIG. 10 and the image projection process according to the fourth embodiment as illustrated in FIG. 15, it is assumed that the data format in which the projector is capable of projecting image data is unknown. According to a fifth embodiment of the present invention, the information terminal 101 is capable of acquiring information from a projector on the data format projectable by the projector (data format compatible with the projector).

Figure 16:
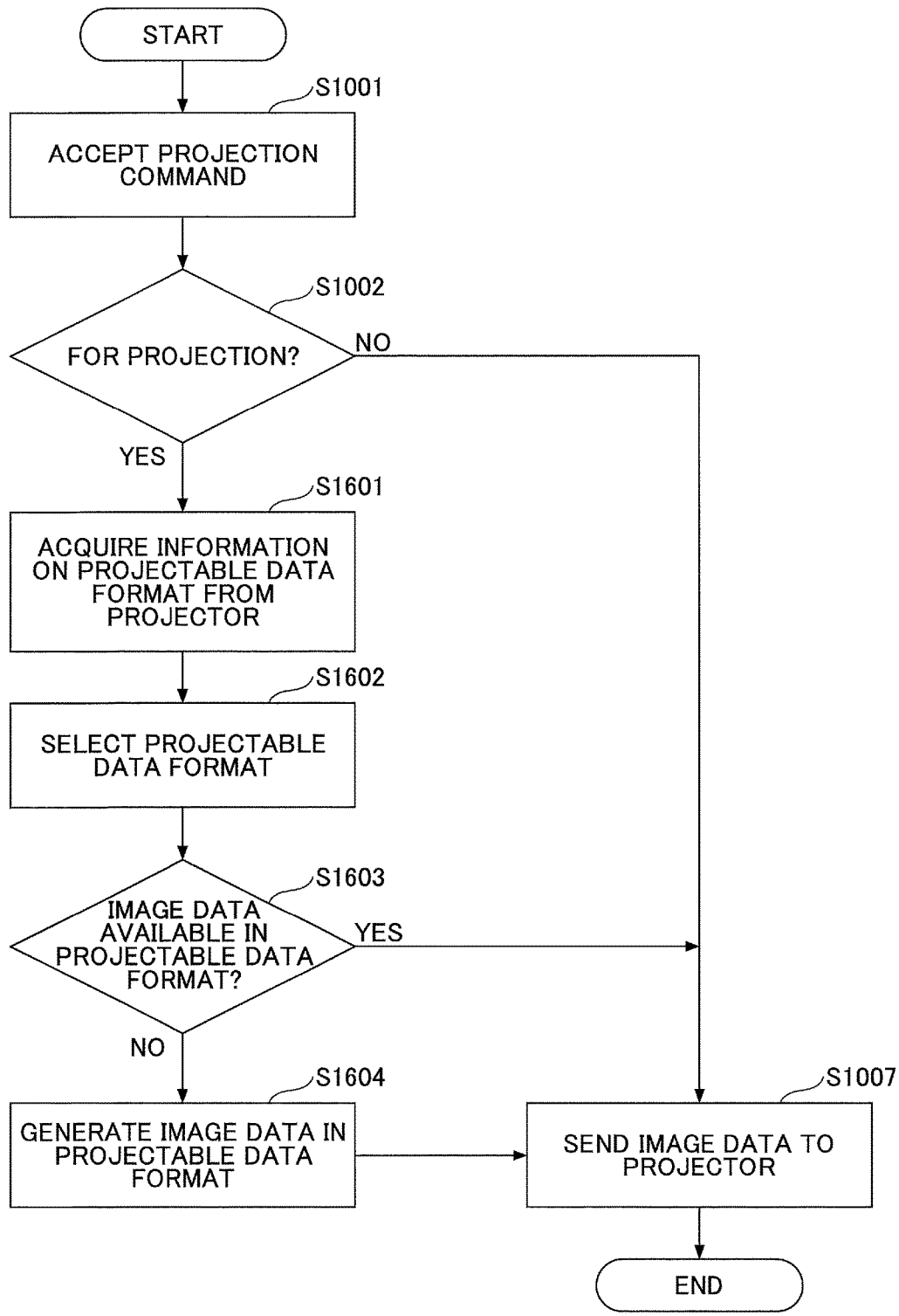
FIG. 16 is a flowchart illustrating an image projection process according to a fifth embodiment of the present invention.

FIG. 16 is a flowchart illustrating the image projection processing according to the fifth embodiment. Note that the processes of steps S1001, S1002, and S1007 of FIG. 16 are substantially identical to those of the image projection process according to the first embodiment illustrated in FIG. 10 such that descriptions thereof are omitted. The following descriptions focus on features of the fifth embodiment that differ from the first embodiment.

According to the present embodiment, in step S1002 of FIG. 16, if the image data designated in the projection command that has been accepted corresponds to image data for projection, the information terminal 101 proceeds to step S1601.

Upon proceeding to step S1601, the information acquisition unit 603 of the information terminal 101 acquires information on the data format compatible with the projector. Then, based on the information on the compatible data format acquired by the information acquisition unit 603, the determination unit 707 of the information terminal 101 selects the image data in the data format compatible with the projector from among the image data in the plurality of different data formats designated by the projection command (step S1602).

In step S1603, the image projection process is bifurcated depending on whether image data in a data format compatible with the projector is found from among the plurality of image data sets in the plurality of different data formats in step S1602.

In the case where image data in the data format compatible with the projector is found in step S1602 (step S1603, YES), the process proceeds to step S1007 where the information terminal 101 sends the image data in the data format compatible with the projector to the projector and terminates the image projection process.

On the other hand, in the case where image data in the data format compatible with the projector is not found from among the plurality of image data sets in the plurality of different data formats in step S1602, the image generation unit 705 of the information terminal 101 generates image data in the data format compatible with the projector.

For example, the image generation unit 705 may use one image data set from among the plurality of image data sets acquired in the plurality of different data formats by the acquisition control unit 702, and convert the data format of the image data set into the data format compatible with the projector by changing features such as the image format, the resolution, and/or the color depth of the image data set, for example. Alternatively, the image generation unit 705 may use one image data set from among the plurality of image data sets acquired in the plurality of different data formats by the acquisition control unit 702 to perform an image process such as image enlargement, image reduction, or smoothing on the image data set to generate image data in the data format compatible with the projector. Then, in step S1007, the information terminal 101 transmits the image data generated by the image generation unit 705 to the projector and terminates the image projection process.

According to the above-described process, when the information terminal 101 is able to acquire information on the data format projectable by a projector to be used, the image projection process of FIG. 10 or FIG. 15 may be executed more efficiently, for example.

Sixth Embodiment

According to a sixth embodiment of the present invention, the image acquisition process may be executed in "memory-saving" mode to conserve storage space storing for image data in the information terminal 101.

Figure 17:
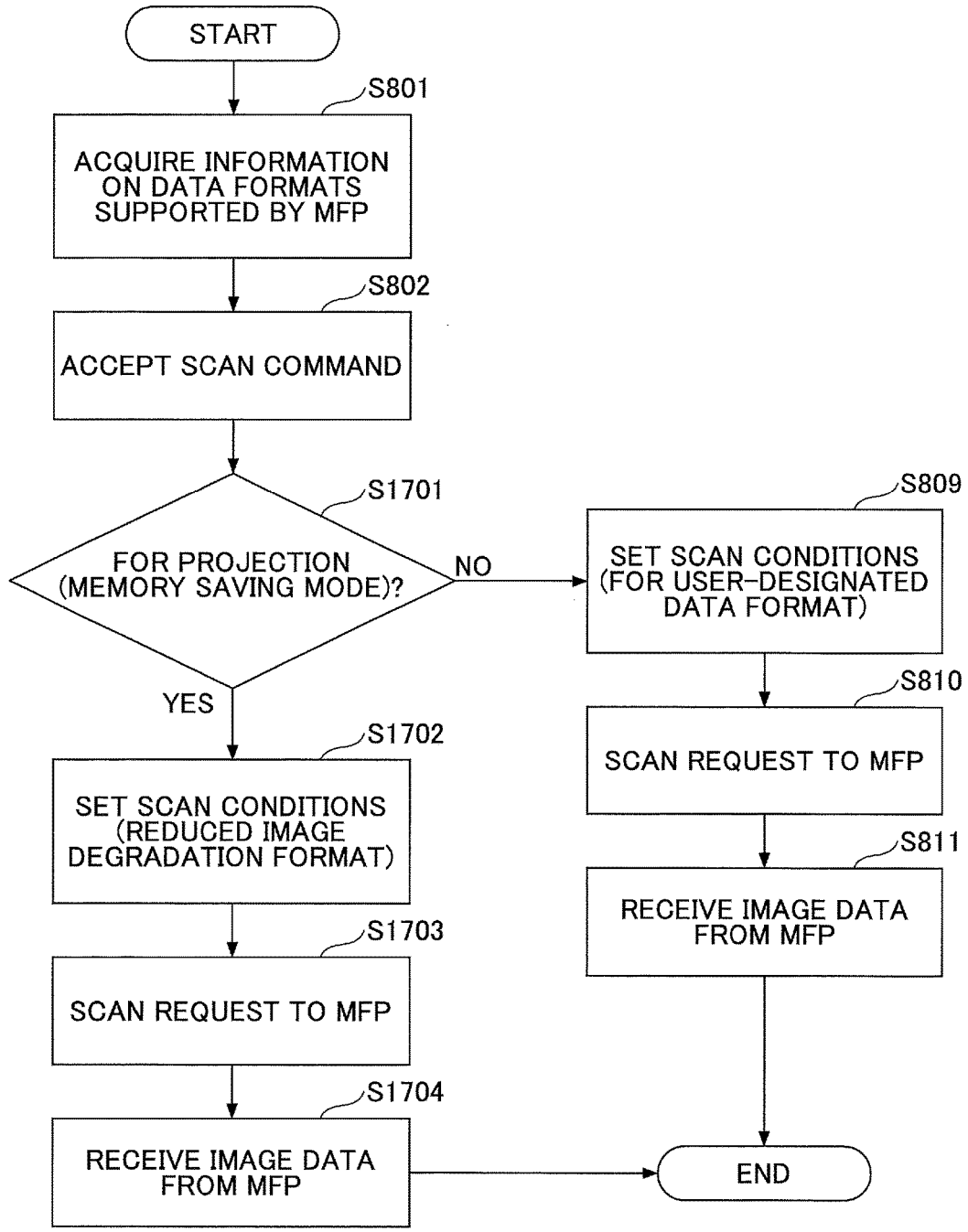
FIG. 17 is a flowchart illustrating an image acquisition process according to a sixth embodiment of the present invention.

FIG. 17 is a flowchart illustrating the image acquisition process according to the sixth embodiment. Note that the processes of steps S801, S802, and S809-S811 of FIG. 17 are substantially identical to those of the image acquisition process according to the first embodiment illustrated in FIG. 8 such that descriptions thereof are omitted. The following descriptions focus on features of the sixth embodiment that differ from the first embodiment.

In FIG. 17, it is assumed that before starting the image acquisition process, the app of the information terminal 101 is set to "memory-saving" mode. In the "memory-saving" mode, the app of the information terminal 101 performs processes while attempting to conserve storage space for storing image data.

When the information terminal 101 that is set to "memory-saving" mode accepts a scan command in step S802 of FIG. 17, the information terminal 101 determines whether the scan command corresponds to a scan command for projection in step S1701. In step S1701, if it is determined that a scan command for projection has been accepted, the information terminal 101 proceeds to step S1702.

Upon proceeding to step S1702, the acquisition control unit 702 of the information terminal 101 sets up scan conditions for scanning/acquiring image data in a data format with reduced image degradation (e.g., non-compression format such as the TIFF format) and sends a scan command to the MFP to request the MFP to perform scanning according to the designated scan conditions (step S1703). Then, step S802 of FIG. 17, the acquisition control unit 702 of the information terminal 101 receives the scanned image data from the MFP, stores the received image data in the storage unit 708, and terminates the image acquisition process.

Note that in the first to fifth embodiments, the information terminal 101 acquires image data in a plurality of different data formats from the MFP. However, in the present embodiment, in order to conserve storage space for storing image data, the information terminal 10 acquires one image data set in a data format with reduced image degradation. Also, according to an aspect of the present embodiment, the information terminal 101 may generate image data in a plurality of different data formats upon projecting the image data based on the one image data set acquired in the image acquisition process. In this way, the storage space for storing image data in the information terminal 101 may be conserved, for example.

Note that the first to sixth embodiments described above are merely examples and are not intended to limit the scope of the present invention.

For example, an image acquisition unit that is used by the information terminal 101 to acquire image data to be displayed in a plurality of different data formats does not necessarily have to be the image forming apparatus 102 of FIG. 1. In some embodiments, an imaging unit (e.g., camera unit 309 of FIG. 3) included in the information terminal 101 may be used as the image acquisition unit for acquiring image data to be displayed, for example.

Also, the display apparatus 103 used by the information terminal 101 to display an image to be displayed may include a plurality of different projectors such as the projector A 202 and the projector B 203 of FIG. 2, for example. In this case, the information terminal 101 may use the single merged file acquired in the second embodiment, for example, to easily project an image to be displayed at a plurality of different projectors that display image data at different resolutions and/or in different image formats, for example.

Further, in some embodiments, at least one of the image analysis unit 701, the acquisition control unit 702, the priority order assigning unit 703, the image data merging unit 704, and the storage unit 708 of FIG. 7 may be included in the image forming apparatus 102 or a server apparatus that is connected to the information terminal 101 via a network, for example. Likewise, in some embodiments, at least one of the image generation unit 705, the display control unit 706, and the determination unit 707 may be included in the display apparatus 103 or a server apparatus that is connected to the information terminal 101 via a network, for example.

Further, the display apparatus 103 does not necessarily have to be a projector but may also be an electronic blackboard or the like, for example.

As can be appreciated from the above, the image processing system 100 according to an embodiment of the present invention have various system configurations.

SUMMARY

According to an embodiment of the present invention, an information processing apparatus (101) includes an acquisition control unit (702) that acquires a plurality of image data sets of an image to be displayed in a plurality of different data formats using an image acquisition unit (102) that acquires image data. The information processing apparatus (101) also includes a determination unit (707) that determines one image data set to be displayed by an image display unit (103) from among the plurality of image data sets acquired in the plurality of different data formats by the acquisition control unit (702) based on the image display unit (103) that will display the image.

With such a configuration, the information processing apparatus according to the above embodiment may easily acquire an image to be displayed from the image forming apparatus (image acquisition unit) and display the acquired image on any display apparatus (image display unit).

Note that the above reference numerals in parentheses are indicated in order to facilitate understanding of aspects of the present invention and are merely illustrative examples that are not intended to limit the scope of the present invention.

Although the present invention has been described above with reference to certain illustrative embodiments, the present invention is not limited to these embodiments, and numerous variations and modifications may be made without departing from the scope of the present invention.

The present application is based on and claims the benefit of priority of Japanese Patent Application No. 2015-051968 filed on Mar. 16, 2015, the entire contents of which are hereby incorporated by reference.

What is claimed is:

1. An information processing apparatus comprising:
   a hardware processor; and
   a hardware memory that contains instructions, which when executed, cause the hardware processor to:
   acquire, using an image acquisition device, a plurality of different image data files from a same document to be displayed, wherein each different image data file among the plurality of different image data files is acquired from the image acquisition device in a different image data format, in response to a single operation received from a user at the information processing apparatus; wherein each different image data file among the plurality of image data files contains data corresponding to a same portion of the document to be displayed; and
   determine, from among the acquired plurality of different image data files, one image data file to be displayed by an image display device, based on the image display device that will display the one image data file.

2. The information processing apparatus according to claim 1,
   wherein the image acquisition device is an image forming apparatus having a plurality of functions including scanning and copying; and
   wherein the instructions, when executed, cause the hardware processor to send an image data acquisition request to the image forming apparatus to acquire the plurality of different image data files from the same document to be displayed.

3. The information processing apparatus according to claim 2, wherein
   when the image forming apparatus receives the image data acquisition request from the information processing apparatus, the image forming apparatus determines whether the image data acquisition request is for acquiring image data to be sent to an apparatus other than the information processing apparatus; and
   when the image data acquisition request is for acquiring image data to be sent to an apparatus other than the information processing apparatus, the image forming apparatus generates the plurality of different image data files and sends the generated plurality of different image data files to the information processing apparatus.

4. The information processing apparatus according to claim 2, wherein, in response to the single operation received from the user at the information processing apparatus, a plurality of image data acquisition requests are sent to the image forming apparatus to acquire the plurality of different image data files from the same document to be displayed, each image data acquisition request among the plurality of image data acquisition requests corresponding to a different data format.

5. The information processing apparatus according to claim 1,
   wherein the instructions, when executed, cause the hardware processor to accept from a user, a projection image acquisition request for acquiring a projection image to be projected by the image display device;
   wherein the image display device is an image projection apparatus; and
   wherein the instructions, when executed, cause the hardware processor to acquire the plurality of different image data files after the projection image acquisition request is accepted.

6. The information processing apparatus according to claim 1, wherein the instructions, when executed, cause the hardware processor to:
   analyze information relating to characters included in image data from the same document to be displayed, the image data from the same document to be displayed being acquired in a predetermined data format;
   acquire the image data from the same document to be displayed in the predetermined data format using the image acquisition device, and determine whether to acquire the plurality of different image data files based on the information relating to the characters included in the image data acquired in the predetermined data format.

7. The information processing apparatus according to claim 1, wherein the instructions, when executed, cause the hardware processor to:
   assign a priority order to each of the plurality of different image data files;
   wherein the priority order is assigned based on at least one of image format information, resolution information, color depth information, color mode information, and data size information of the plurality of different image data files.

8. The information processing apparatus according to claim 1, wherein the instructions, when executed, cause the hardware processor to:
merge each image data file among the plurality of different image data files into a single file.

9. The information processing apparatus according to claim 1, wherein the instructions, when executed, cause the hardware processor to:
sequentially transmit each image data file among the plurality of different image data files to the image display device until an image data file in a data format compatible with the image display device is transmitted to the image display device; and
determine the image data file in the data format compatible with the image display device as the one image data file to be displayed by the image display device.

10. The information processing apparatus according to claim 1, wherein the instructions, when executed, cause the hardware processor to:
acquire information relating to a data format compatible with the image display device;
determine the one image data file to be displayed by the image display device from among the plurality of different image data files based on the acquired information relating to the data format compatible with the image display device.

11. The information processing apparatus according to claim 1, wherein the instructions, when executed, cause the hardware processor to:
generate one image data file in a data format compatible with the image display device based on at least one image data file among the acquired plurality of image data files, in a case where the acquired plurality of image data files does not include image data in the data format compatible with the image display device.

12. The information processing apparatus according to claim 1, wherein the instructions, when executed, cause the hardware processor to acquire, using the image acquisition device, the plurality of different image data files from a same page of the same document to be displayed, wherein each image data file among the plurality of different image data files acquired from the same page of the same document to be displayed is acquired in a different data format.

13. The information processing apparatus according to claim 1, wherein a TIFF image file and a JPEG image file are included among the plurality of different image data files.

14. The information processing apparatus according to claim 1, wherein the plurality of different image data files includes a first image data file in a first file format that is not displayable by the image display device and a second image data file in a second file format that is displayable by the image display device.

15. The information processing apparatus according to claim 1,
wherein the image acquisition device is an image forming apparatus having a plurality of functions including scanning and copying;
wherein the instructions, when executed, cause the hardware processor to:
display a setting screen that includes (i) a setting field, (ii) a first button for causing the image forming apparatus to perform a normal scanning process, and (iii) a second button for causing the image forming apparatus to generate the plurality of different image data files from the same document to be displayed;
cause the normal scanning process to execute when the first button is pressed, and cause the image forming apparatus to generate the plurality of different image data files when the second button is pressed.

16. A non-transitory computer-readable medium storing a computer program that when executed causes an information processing apparatus to perform an information processing method comprising the steps of:
acquiring, using an image acquisition device, a plurality of different image data files from a same document to be displayed, wherein each different image data file among the plurality of different image data files is acquired from the image acquisition device in a different image data format, in response to a single operation received from a user at the information processing apparatus; wherein each different image data file among the plurality of image data files contains data corresponding to a same portion of the document to be displayed; and
determining, from among the acquired plurality of different image data files, one image data file to be displayed by an image display device, based on the image display device that will display the one image data file.

17. An information processing system comprising:
an image forming apparatus; and
an information terminal;
wherein the image forming apparatus includes:
a hardware processor; and
a hardware memory that contains instructions, which when executed, cause the hardware processor to:
scan a document to be displayed and generate a plurality of different image data files from the document to be displayed, in response to a single operation received from a user at the information terminal; wherein each generated image data file among the plurality of different image data files is generated in a different image data format; wherein each different image data file among the plurality of image data files contains data corresponding to a same portion of the document to be displayed; and
send the plurality of different image data files generated in the different image data formats to the information terminal;
wherein the information terminal includes:
another hardware processor; and
another hardware memory that contains different instructions, which when executed, cause the another hardware processor to:
acquire, the plurality of different image data files from the same document to be displayed, wherein each different image data file among the plurality of different image data files is acquired from the image forming apparatus in a different data format; and
determine, from among the acquired plurality of different image data files, one image data file to be displayed by an image display device, based on the image display device that will display the one image data file.

* * * * *